(12) United States Patent
Kurauchi

(10) Patent No.: US 7,450,646 B2
(45) Date of Patent: Nov. 11, 2008

(54) IMAGE DATA TRANSMITTING APPARATUS AND METHOD AND IMAGE DATA REPRODUCING APPARATUS AND METHOD

(75) Inventor: Nobukazu Kurauchi, Nagoya (JP)

(73) Assignee: Panasonic Corporation, Osaka (JP)

( * ) Notice: Subject to any disclaimer, the term of this patent is extended or adjusted under 35 U.S.C. 154(b) by 957 days.

(21) Appl. No.: 10/452,058

(22) Filed: Jun. 3, 2003

(65) Prior Publication Data

US 2003/0223494 A1 Dec. 4, 2003

(30) Foreign Application Priority Data

Jun. 4, 2002 (JP) ............... 2002-162507
Apr. 1, 2003 (JP) ............... 2003-097893

(51) Int. Cl.
*H04N 7/18* (2006.01)
(52) U.S. Cl. .............. 375/240.26; 375/240.24
(58) Field of Classification Search ................. 375/240.01–240.29
See application file for complete search history.

(56) References Cited

U.S. PATENT DOCUMENTS 6,014,694 A * 1/2000 Aharoni et al. ............. 709/219
6,940,903 B2 * 9/2005 Zhao et al. ............. 375/240.08
7,131,048 B2 * 10/2006 Suzuki et al. ............... 714/748

FOREIGN PATENT DOCUMENTS

| JP | 8-242445 | 9/1996 |
| JP | 9-247676 | 9/1997 |
| JP | 2000-78573 | 3/2000 |
| JP | 2000-236496 | 8/2000 |
| JP | 2002-135712 | 5/2002 |
| JP | 2003-32617 | 1/2003 |

* cited by examiner

*Primary Examiner*—Andy S Rao
(74) *Attorney, Agent, or Firm*—Wenderoth, Lind & Ponack, L.L.P.

(57) ABSTRACT

An image data transmitting apparatus and an image data transmitting method are provided which can distribute streaming moving images at a transfer rate in accordance with a transmission band with degradation in image quality being mitigated even at the time of congestion. A priority determining section 43 reads encoded data stored in the buffer 42 in units of VOP, and then calculates a priority for each VP in terms of VOP based on the amount of encoded data of VP and the number of MBs. A transmission control section 44 determines VPs starting from a VP of the highest priority that have a data amount up to the amount of transmittable encoded data. This determination is made based on the current state of congestion on a network 6 managed by a congestion state managing section 46 and the priorities calculated by the priority determining section 43. A VP transmitting section 45 stores the determined VPs in transmission packets for sequential transmission to a client 5.

14 Claims, 20 Drawing Sheets

FIG. 5

| VP | | | | AMOUNT OF ENCODED DATA (kbit) | THE NUMBER OF MBs | AVERAGE AMOUNT OF ENCODED DATA (kbit) |
|---|---|---|---|---|---|---|
| VP1 | MB | ... | MB | 90 | 30 | 3 |
| VP2 | MB | ... | MB | 90 | 15 | 6 |
| VP3 | MB | ... | MB | 80 | 8 | 10 |
| VP4 | MB | ... | MB | 99 | 9 | 11 |
| VP5 | MB | ... | MB | 80 | 8 | 10 |
| VP6 | MB | ... | MB | 80 | 20 | 4 |
| VP7 | MB | ... | MB | 75 | 15 | 5 |

AMOUNT OF ENCODED DATA

FIG. 6

| TRANSMISSION PRIORITY | VIDEO PACKET | AVERAGE AMOUNT OF ENCODED DATA (kbit) | AMOUNT OF ENCODED DATA (kbit) | ACCUMULATED AMOUNT OF ENCODED DATA (kbit) |
|---|---|---|---|---|
| 1 | VP4 | 11 | 99 | 99 |
| 2 | VP3 | 10 | 80 | 179 |
| 3 | VP5 | 10 | 80 | 259 |
| 4 | VP2 | 6 | 90 | 349 |
| 5 | VP7 | 5 | 75 | 424 |
| 6 | VP6 | 4 | 80 | 504 |
| 7 | VP1 | 3 | 90 | 594 |

F I G. 9

| TRANSMISSION PRIORITY | V O P | VIDEO PACKET | AVERAGE AMOUNT OF ENCODED DATA (kbit) | AMOUNT OF ENCODED DATA (kbit) | ACCUMULATED AMOUNT OF ENCODED DATA (kbit) |
|---|---|---|---|---|---|
| 1 | I | V P 4 | 11 | 99 | 99 |
| 2 | P 2 | V P 2 | 10.5 | 84 | 183 |
| 3 | I | V P 3 | 10 | 80 | 263 |
| 4 | I | V P 5 | 10 | 80 | 343 |
| 5 | B 4 | V P 5 | 9 | 77 | 420 |
| 6 | P 2 | V P 6 | 8 | 75 | 495 |
| ⋮ | | | | | |
| n | B 1 | V P 1 | 1 | 20 | 34850 |

F I G. 2 6 PRIOR ART
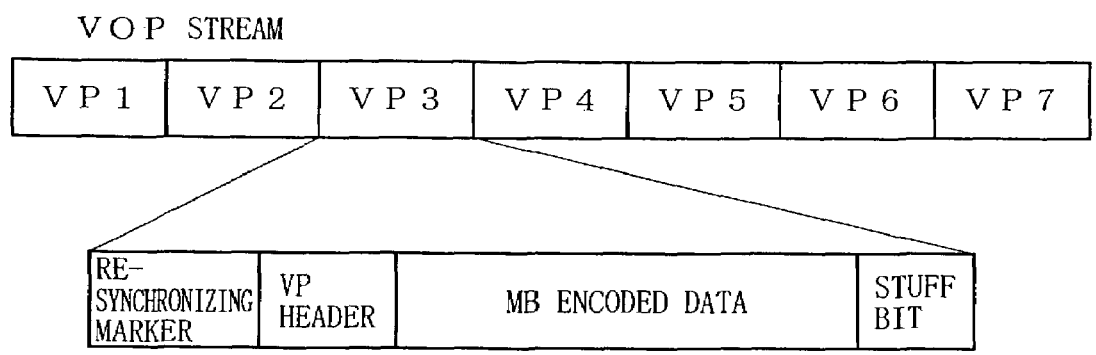
F I G. 2 7 PRIOR ART
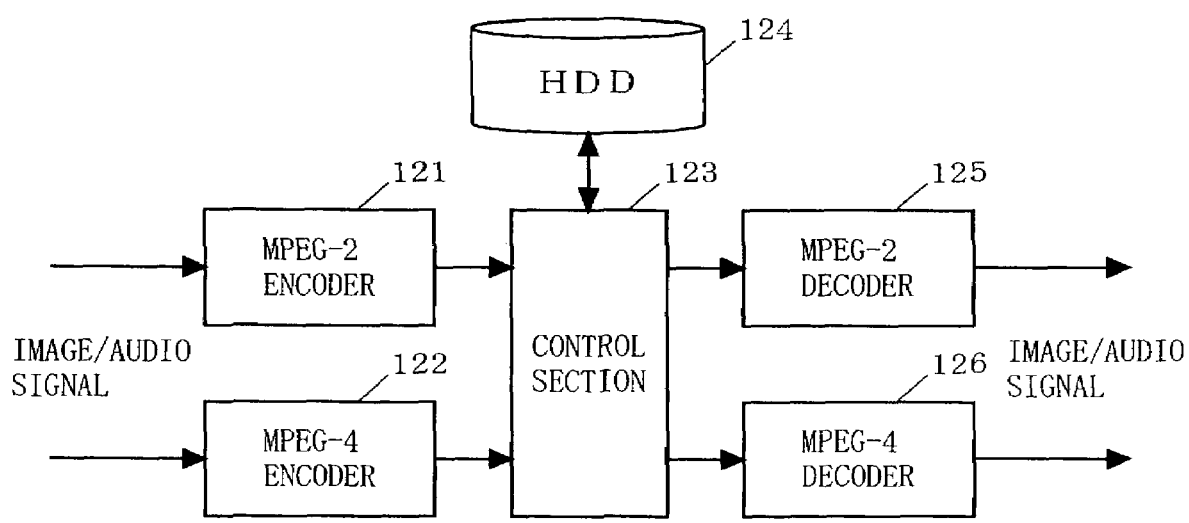

IMAGE DATA TRANSMITTING APPARATUS AND METHOD AND IMAGE DATA REPRODUCING APPARATUS AND METHOD

BACKGROUND OF THE INVENTION

1. Field of the Invention

The present invention relates to image data transmitting apparatuses and methods and image data reproducing apparatuses and methods. More specifically, the present invention relates to an image data transmitting apparatus and method for transmitting images by using encoded image data, and an image data reproducing apparatus and method for performing high-speed replay of images by using encoded image data.

2. Description of the Background Art

The recent remarkable progress of digital image/audio signal processing technologies has brought various systems and devices into practical use. Such systems and devices include a system for transmitting high-quality digital image signals via a network, such as the Internet, and a device for recording digital image signals on a hard disk (HDD) or DVD-RAM (digital Versatile Disc-RAM) for replay.

One main example of those digital signal processing technologies is an encoding technology for compressing and encoding digitized signals. There are various standards for the encoding technology. Particularly in the field of moving pictures, MPEG (Moving Picture Image Coding Experts Group) standards are mainstream. Such standards include, for example, MPEG-2 typically used in digital broadcasting systems and MPEG-4 typically used in image transmission by camera-equipped cellular phones.

As is well known, a move from narrowband to broadband Internet access is accelerating. Therefore, in recent years, image data can be used not only after being entirely downloaded, but also on a real-time basis in the order of reception, which is typically implemented by a streaming technique.

In the streaming technique, a technology for image distribution on a real-time basis plays an important role. Therefore, it is crucial how problems of excessive communication loads, that is, congestion, on the network, typically caused by a lot of accesses are addressed. Conventionally, in order to get around such problems, the receiving side temporarily stops replaying until necessary image data arrives, or the transmitting side discards part of image data so as to adjust a transfer rate in accordance with the state of congestion. This causes yet other disadvantages at the time of congestion to the receiving side, such as interruption of image viewing and degradation of image quality.

In order to overcome such disadvantages, hierarchical encoding techniques are useful, for example. FIG. 19 is an illustration for describing an outline of a first hierarchical encoding technique. An encoder 101 performs a predetermined encoding process on input image data to generate a plurality of encoded image data pieces (streams) of different image qualities for one piece of image data. In the example of FIG. 19, three types of encoded image data are generated: high-quality image data for 1 Mpbs, intermediate-quality image data for 500 kbps, and low-quality image data for 200 kbps. Those pieces of data are stored in an image storage section 102. A distribution server 103 checks the state of a network 106, reads from the image storage section 102 one type of encoded image data that is transmittable at a transfer rate in accordance with the state, and then transmits the read data to a client 105.

FIG. 20 is an illustration for describing an outline of a second hierarchical encoding technology using a slicing technique defined by MPEG. An encoder 11 performs a predetermined encoding process on input image data to generate encoded image data. At this time, the encoder 111 divides the input image data into a plurality of slices of appropriate quality based on the transfer rate in accordance with the state of the network 106 reported from a distribution server 113, and then gives a different priority to each of these slices. A distribution server 113 transmits these slices and their priorities to the client 105.

The concept of the slicing technique defined by MPEG is briefly described below. In MPEG-4, each slice is called a video packet (VP), and therefore is hereinafter referred to as VP.

Moving images encoded with MPEG-4 are composed of a series of images as illustrated in FIG. 21, which is called a video object (VO) in MPEG-4. Each VO is composed of a plurality of video object planes (VOPs). A VOP is a basic unit of image data corresponding to one frame. In the drawing, I denotes a VOP of an I frame (intraframe) representing intraframe encoded image data, P denotes a VOP of a P frame (predicted frame) representing encoded image data obtained by previous frame prediction, and B denotes a VOP of a B frame (bi-directional frame) representing encoded image data obtained by bi-directional prediction. A plurality of frames starting from an I-VOP forms a GOV (group of VOPs). Each VOP is divided into a plurality of areas called video packets (VPs) (FIG. 22). Each VP contains a plurality of macroblocks (MBs) (FIG. 23). Each MB contains a luminance block of 16×16 pixels that is composed of four blocks of 8×8 pixels each, and two color-difference blocks of 8×8 pixels each (FIG. 24). The amount of encoded data of the MB is varied depending on the contents of the image.

In a VP dividing technique, VPs are generated for each VOP so as to have a size in accordance with the amount of movement of the image. Specifically, the VOPs are divided so that the total amount of encoded data (the number of bits) for one VP is equal or approximately equal to that for every other VP (FIG. 25). For an area containing a small motion, a large VP composed of a large number of MBs is generated. For an area containing a large motion, a small VP composed of a small number of MBs is generated. For example, in FIG. 22, VP1 and VP7 each represent an area containing a small motion, while VP3, VP4, and VP5 each represent an area containing a large motion. FIG. 26 is an illustration showing the structures of a VOP stream and each VP.

As such, with the amounts of encoded data contained in the VPs being set approximately equal to each other, each VP has a similar probability of inclusion of error. Therefore, VPs containing a large motion, which have a great impact on the image, occupy a small space, thereby making it possible to better localize portions degraded in image quality due to error.

The above-described conventional hierarchical encoding technologies are disclosed in, for example, Japanese Patent Laid-Open Publication Nos. 2000-78573 and 8-242445 (1996-242445).

Meanwhile, with the advance of digital network technologies, encoded image data of MPEG-4 and MPEG-2 may be mixed for use. In order to handle such mixture of encoded data, Japanese Patent Laid-Open Publication 2003-32617 discloses a recording and reproducing device capable of recording a plurality of pieces of encoded image data of different standards, such as MPEG-2 and MPEG-4, in a single recording medium and reproducing these pieces of data individually.

FIG. 27 is a block diagram illustrating the configuration of the recording and reproducing device disclosed in the above Japanese Patent Laid-Open Publication 2003-32617. In FIG.

27, an MPEG-2 encoder 121 encodes an input image signal based on MPEG-2 standard. An MPEG-4 encoder 122 encodes an input image signal based on MPEG-4 standard. A controller 123 causes the encoded data supplied by these encoders to be recorded on an HDD (image storage section) 124. The controller 123 also reproduces the encoded data recorded in the HDD 124. To reproduce the MPEG-2 encoded data, the controller 123 supplies the encoded data reproduced from the HDD 124 to an MPEG-2 decoder 125. To reproduce the MPEG-4 encoded data, the controller 123 supplies the encoded data reproduced from the HDD 124 to an MPEG-4 decoder 126. With this, the conventional recording and reproducing device allows recording and reproducing of moving images based on MPEG-2 and MPEG-4 standards.

However, the above-described conventional technologies and the above-described recording and reproducing device have drawbacks as follows. In the above first hierarchical encoding technology, a plurality of pieces of encoded image data have to be redundantly retained, thereby requiring a recording medium of large capacity. Moreover, the image that can be transmitted to the client is restricted to any of these pieces of data redundantly retained. Therefore, transmission always at a transfer rate best suited for the state of the network cannot be ensured. For example, even a slight change in transmission band that can be allocated on the network from 1 Mbps to 800 kbps leads to an unreasonable reduction in image quality to the intermediate-quality image data for 500 kbps.

Furthermore, in the above second hierarchical encoding technology, encoding and VP dividing processes are performed on the input image signal always in consideration of the state of the network. This puts the encoding process under a large load. Particularly when a plurality of clients make requests through Video On Demand (VOD) for image distribution, different encoding processes have to be performed for those clients. This significantly increases the amount of encoding process, and therefore is not practical.

Still further, in the above conventional recording and reproducing device, when a high-speed replay function suggested in MPEG-2 is applied to the encoded image data of MPEG-4, images cannot be smoothly replayed at high speed. This is because an I frame for high-speed replay is inserted approximately every 0.5 seconds in MPEG-2, while an I-VOP, which is equivalent to the I frame, is inserted generally at a relatively low frequencies, for example, approximately every five seconds, in MPEG-4. For this reason, a change in image between I frames is small in MPEG-2 and does not visually affect the image replayed at high speed, while a change in image between I-VOPs is large in MPEG-4 and visually affects the image replayed at high speed.

SUMMARY OF THE INVENTION

Therefore, an object of the present invention is to provide an image data transmitting apparatus and method capable of transmitting, without putting a load on an encoding process, image data at an optimal transfer rate while suppressing degradation in image quality, and an image data reproducing apparatus and method capable of smoothly reproducing MPEG-4 image data at high speed.

The present invention has the following features to attain the object mentioned above.

A first aspect of the present invention is directed to an image data transmitting apparatus which transmits image data having been encoded in units of MB, which is a basic picture element, and having been divided into a plurality of VPs each containing at least one MB.

The image data transmitting apparatus according to the first aspect includes a priority determining section for calculating an average amount of data per MB for each of the plurality of VPs, and determining, for each of predetermined segments forming the image data and each containing at least two VPs, a priority of each of the plurality of VPs in descending order of the average amount of data; and a transmission control section for determining an amount of transmittable data of each of the predetermined segments based on a state of transmission of the image data, selecting, for each of the predetermined segments, VPs of high priorities having a data amount up to the amount of transmittable data, and transmitting the selected VPs.

As described above, according to the first aspect, the priority of each VP is determined based on the average amount of encoded data obtained by dividing the amount of encoded data by the number of MBs. This determination is based on the fact that, in an area containing a large motion, which has a great impact on the image, the amount of data per MB (the amount of encoded data) is large. Based on the determination results, the VPs are transmitted in descending order of the average amount of encoded data. Thus, under the circumstances in which the image data transfer rate has to be decreased at the time of congestion on the network, for example, the transfer rate can be optimized, and degradation in image quality can be mitigated. Particularly, in the first aspect, without determining the degree of importance and the order of priority of moving images by using motion information, the image data transmitting apparatus can control the transfer rate by discarding packets based on the amount of encoded data to be transmitted. Also, when the amounts of encoded data of the VPs are approximately equal to each other, influences due to transfer error can be more localized, thereby reinforcing error resistance.

In the first aspect, when the image data has been divided into a plurality of VPs approximately equal in data amount to each other and each containing at least one MB, the priority determining section can determine, for each of the predetermined segments, a priority of each of the plurality of VPs in ascending order of the number of MBs included in each of the VPs. This determination is made based on the fact that, when the amounts of data of the VPs are approximately equal to each other, VPs containing a larger motion have a smaller number of MBs.

Also, if the image data has been encoded and divided into the VPs based on MPEG-4, the predetermined segments of the image data are preferably VOPs or GOVs.

A second aspect of the present invention is directed to an image data transmitting method for transmitting image data having been encoded in units of MB, which is a basic picture element, and having been divided into a plurality of VPs containing at least one MB.

The image data transmitting method according to the second aspect includes the steps of: calculating an average amount of data per MB for each of the plurality of VPs; determining, for each of predetermined segments forming the image data and each containing at least two VPs, a priority of each of the plurality of VPs in descending order of the average amount of data; determining an amount of transmittable data of each of the predetermined segments based on a state of transmission of the image data; selecting, for each of the predetermined segments, VPs of high priorities having a data amount up to the amount of transmittable data; and transmitting the selected VPs.

In the second aspect, when the image data has been divided into a plurality of VPs approximately equal in data amount to each other and each containing at least one MB, the priority determining section can determine, for each of the predetermined segments, a priority of each of the plurality of VPs in ascending order of the number of MBs included in each of the VPs. This determination is made based on the fact that, when the amounts of data of the VPs are approximately equal to each other, VPs containing a larger motion have a smaller number of MBs.

Also, if the image data has been encoded and divided into the VPs based on MPEG-4, the predetermined segments of the image data are preferably VOPs or GOVs.

It can be thought that a program for causing a computer to execute each step according to the second aspect is recorded on a computer-readable recording medium. By providing such a recording medium to the existing various image data transmitting apparatuses, it is possible to cause these apparatus to execute the processing according to the second aspect of the present invention.

A third aspect of the present invention is directed to an image data reproducing apparatus which decodes and reproduces image data having been encoded in units of MB, which is a basic picture element, and having been divided into a plurality of VPs each containing at least one MB.

The image data reproducing apparatus according to the third aspect includes a control section for setting, based on a speed at high-speed replay, an effective amount of data that can be decoded and for each of predetermined segments forming the image data and each containing at least two VPs; a priority determining section for calculating an average amount of data per MB for each of the plurality of VPs, and determining, for each of the predetermined segments, a priority of each of the plurality of VPs in descending order of the average amount of data; a selecting section for selecting, for each of the predetermined segments, VPs of high priorities having a data amount up to the effective amount of data; a reconstructing section for reconstructing frames for high-speed replay of the image data by using the VPs selected by the selecting section; and a reproducing section for reproducing the image data by decoding and decompressing the reconstructed frames for high-speed replay.

As described above, according to the third aspect, the priority of each VP is determined based on the average amount of encoded data obtained by dividing the amount of encoded data by the number of MBs. This determination is based on the fact that the amount of encoded data per MB is large in an area containing a large motion, which has a great impact on the image. At high-speed replay, VOPs for high-speed replay are generated by reconstructing VPs by prioritizing those of high priorities. Thus, MPEG-4 encoded data can be smoothly replayed at high speed. Also, these VOPs for high-speed replay are generated by putting an area having a large motion on a higher priority. Therefore, block noise can be suppressed.

In the third aspect, when the image data has been divided into a plurality of VPs approximately equal in data amount to each other and each containing at least one MB, the priority determining section can determine, for each of the predetermined segments, a priority of each of the plurality of VPs in ascending order of the number of MBs included in each of the VPs. This determination is made based on the fact that, when the amounts of data of the VPs are approximately equal to each other, VPs containing a larger motion have a smaller number of MBs.

Here, when a speed at normal replay is increased N (N is a real number of 1 or more) fold at high-speed replay, the reproducing section reproduces once every N frames out of all of the decoded and decompressed frames. Also, in this case, the effective amount of data is preferably set to a value obtained by dividing an amount of data that can be decoded and decompressed at normal replay for each of the predetermined segments by N.

Furthermore, if the image data has been encoded and divided into the VPs based on MPEG-4, the predetermined segments of the image data are preferably VOPs or GOVs.

Still further, the predetermined segments are preferably P frames representing encoded image data obtained by previous frame prediction and B frames representing encoded image data obtained by bi-directional prediction.

In the third aspect, when a transition is made at an arbitrary frame from high-speed replay to normal speed replay, the reproducing section typically stops reproducing the image data, goes back to an I frame representing intraframe encoded image data immediately preceding the arbitrary frame to again perform a decoding and decompressing process at normal replay on frames starting from the I frame through the arbitrary frame, and then restarts reproducing the image data at normal replay from the arbitrary frame.

At this time, the reproducing section can perform a process of detecting a remaining time from the arbitrary frame to an I frame representing intraframe encoded image data immediately subsequent to the arbitrary frame. When the remaining time has a value equal to or larger than a predetermined value, the reproducing section stops reproducing the image data, goes back to an I frame representing intraframe encoded image data immediately preceding the arbitrary frame to again perform a decoding and decompressing process at normal replay on frames starting from the I frame through the arbitrary frame, and then restarts reproducing the image data at normal replay from the arbitrary frame. When the remaining time has a value smaller than the predetermined value, the reproducing section reproduces the image data at normal replay from the arbitrary frame.

Alternatively, the image data reproducing apparatus may further include a decoding section for decoding and decompressing all frames of the image data. If so, when a transition is made at an arbitrary frame from high-speed replay to normal speed replay, the reproducing section can reproduce the image data at normal replay from the arbitrary frame by using the image data of the frames decoded and decompressed by the decoding section.

A fourth aspect of the present invention is directed to an image data reproducing method for decoding and reproducing image data having been encoded in units of MB, which is a basic picture element, and having been divided into plurality of VPs each containing at least one MB.

The image data reproducing method according to the fourth aspect includes the steps of: setting, based on a speed at high-speed replay, an effective amount of data that can be decoded and decompressed for each of predetermined segments forming the image data and each containing at least two MBs; calculating an average amount of data per MB for each of the plurality of VPs; determining, for each of the predetermined segments, a priority of each of the plurality of VPs in descending order of the average amount of data; selecting, for each of the predetermined segments, VPs of high priorities having a data amount up to the effective amount of data; reconstructing frames for high-speed replay of the image data by using the selected VPs; and reproducing the image data by decoding and decompressing the reconstructed frames for high-speed replay.

In the fourth aspect, when the image data has been divided into a plurality of VPs that are approximately equal in data amount to each other and each containing at least one MB, the priority determining section can determine, for each of the predetermined segments, a priority of each of the plurality of VPs in ascending order of the number of MBs included in each of the VPs. This determination is made based on the fact that, when the amounts of data of the VPs are approximately equal to each other, VPs containing a larger motion have a smaller number of MBs.

Here, when a speed at normal replay is increased N (N is a real number of 1 or more) fold at high-speed replay, the reproducing step reproduces once every N frames out of all of the decoded and decompressed frames. Also, in this case, the effective amount of data is preferably set to a value obtained by dividing an amount of data that can be decoded and decompressed at normal replay for each of the predetermined segments by N.

Furthermore, if the image data has been encoded and divided into the VPs based on MPEG-4, the predetermined segments of the image data are preferably VOPs or GOVs.

Still further, the predetermined segments are preferably P frames representing encoded image data obtained by previous frame prediction and B frames representing encoded image data obtained by bi-directional prediction.

In the fourth aspect, when a transition is made at an arbitrary frame from high-speed replay to normal speed replay, the reproducing step typically stops reproducing the image data, goes back to an I frame representing intraframe encoded image data immediately preceding the arbitrary frame to again perform a decoding and decompressing process at normal replay on frames starting from the I frame through the arbitrary frame, and then restarts reproducing the image data at normal replay from the arbitrary frame.

At this time, the reproducing step can perform a process of detecting a remaining time from the arbitrary frame to an I frame representing intraframe encoded image data immediately subsequent to the arbitrary frame. When the remaining time has a value equal to or larger than a predetermined value, the reproducing step stops reproducing the image data, goes back to an I frame representing intraframe encoded image data immediately preceding the arbitrary frame to again perform a decoding and decompressing process at normal replay on frames starting from the I frame through the arbitrary frame, and then restarts reproducing the image data at normal replay from the arbitrary frame. When the remaining time has a value smaller than the predetermined value, the reproducing step reproduces the image data at normal replay from the arbitrary frame.

Alternatively, the image data reproducing method may further include a step of decoding and decompressing all frames of the image data. If so, when a transition is made at an arbitrary frame from high-speed replay to normal speed replay, the reproducing step can reproduce the image data at normal replay from the arbitrary frame by using the image data of the frames decoded and decompressed in the decoding step.

It can be thought that a program for causing a computer to execute each step according to the fourth aspect is recorded on a computer-readable recording medium. By providing such a recording medium to the existing various image data reproducing apparatuses, it is possible to cause these apparatus to execute the processing according to the fourth aspect of the present invention.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is an illustration showing one exemplary case in which an average amount of encoded data is calculated for each VP;

FIG. 6 is an illustration showing one example of a priority list created in units of VOP;

FIG. 9 is an illustration showing one example of a priority list created in units of GOV;

FIG. 26 is an illustration showing the structures of a VOP stream and VPs based on MPEG-4; and FIG. 27 is a block diagram showing the configuration of a conventional recording and reproducing apparatus.

DESCRIPTION OF THE PREFERRED EMBODIMENTS

Figure 1:
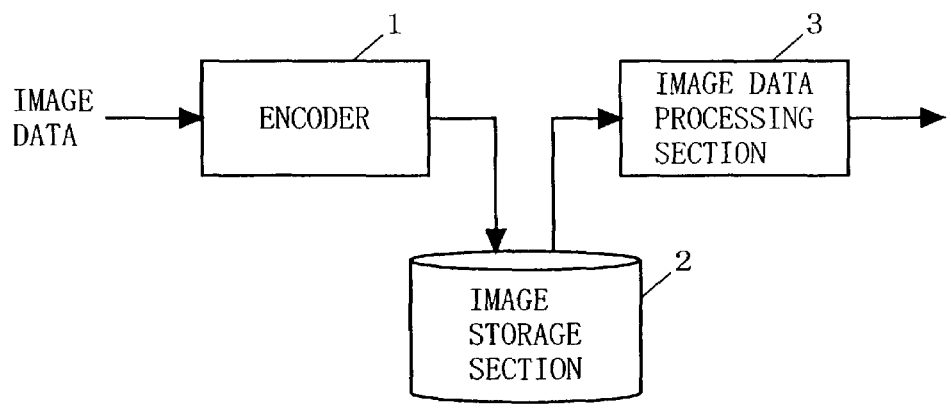
FIG. 1 is an illustration showing an outline of system configuration common to an image data transmitting apparatus and an image data reproducing apparatus of the present invention.
Figure 22:
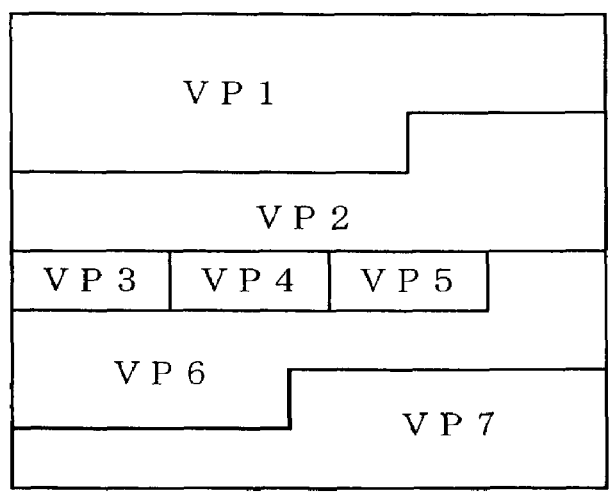
FIG. 22 is an illustration showing one exemplary structure of a VOP of FIG. 21.
Figure 23:
FIG. 23 is an illustration showing one exemplary structure of a VP of FIG. 22.
Figure 24:
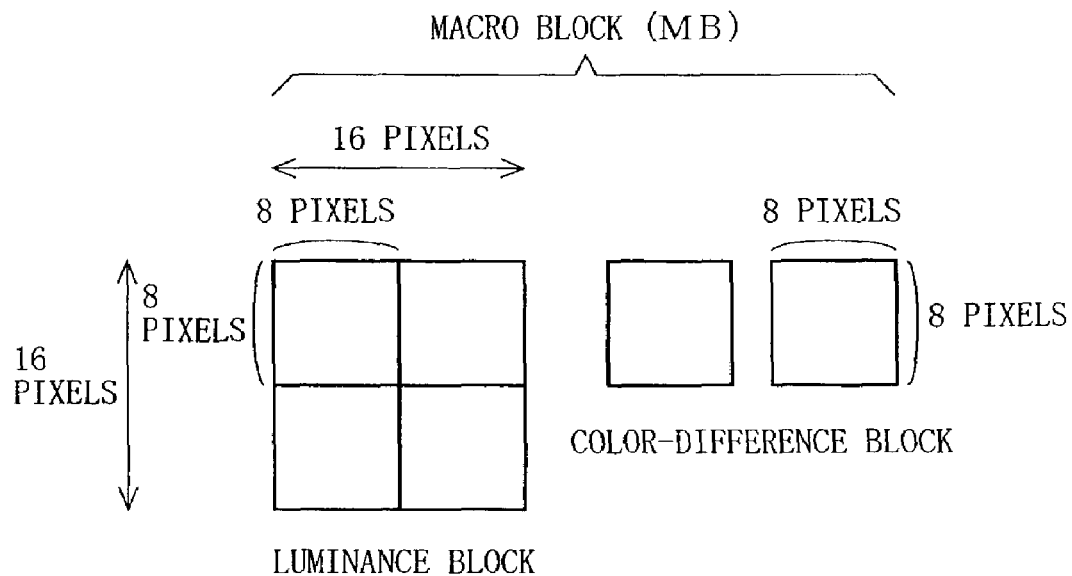
FIG. 24 is an illustration for describing the structure of a MB of FIG. 23.

FIG. 1 is an illustration showing an outline of the configuration of a system common to an image data transmitting apparatus and an image data reproducing apparatus of the present invention. An encoder 1 performs encoding and VP dividing processes as described in Background Art on input image data to sequentially generate a plurality of VOPs of high-quality images. The VOPs (refer to FIG. 22) generated by this encoder 1 are sequentially stored in an image storage section 2. An image data processing section 3 performs a priority determining process, which is a feature of the present invention, on the VOPs stored in the image storage section 2, and then performs a process of transmitting or reproducing image data based on the priority.

The process, which is a feature of the present invention, is described below in a first embodiment concerning the image data transmitting apparatus and method and a second embodiment concerning the image data reproducing apparatus and method. In each embodiment, consider a case where encoded data under MPEG-4 is stored in the image storage section 2. This image storage section 2 has encoded image data stored in a fixed recording medium, such as a hard disk, or transportable recording medium, such as DVD-RAM or a memory card.

First Embodiment

Figure 2:
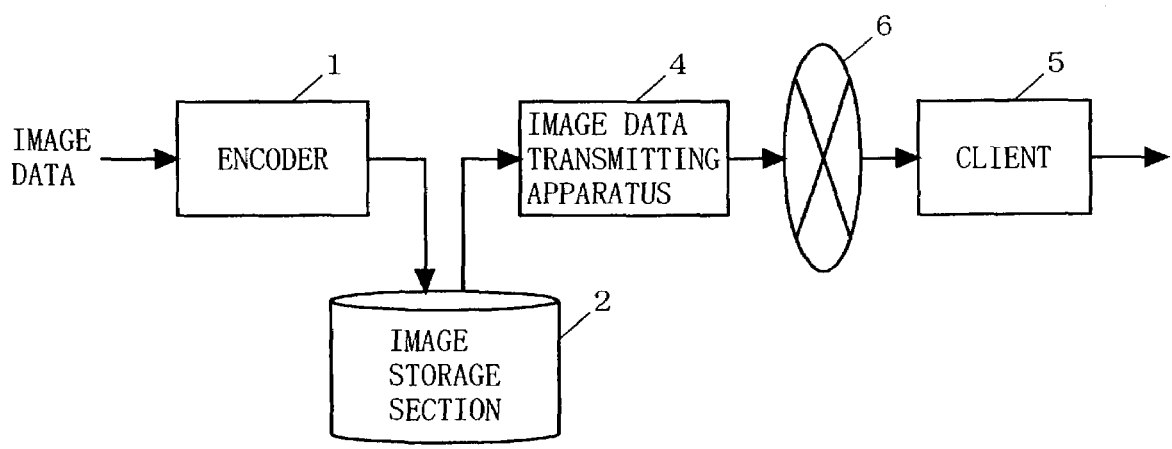
FIG. 2 is an illustration showing the configuration of a system including an image data transmitting apparatus according to the first embodiment of the present invention.

FIG. 2 is an illustration showing the configuration of a system including the image data transmitting apparatus according to the first embodiment of the present invention. As illustrated in FIG. 2, the system is configured so that the image data processing section 3 illustrated in FIG. 1 is implemented by an image data transmitting apparatus 4 serving as a distribution server for distributing image streams as requested, a client 5 which receives image streaming upon operation by a user, and a network 6 which connects therebetween. Hereinafter, the first embodiment of the present invention is described focusing on the image data transmitting apparatus 4.

Figure 3:
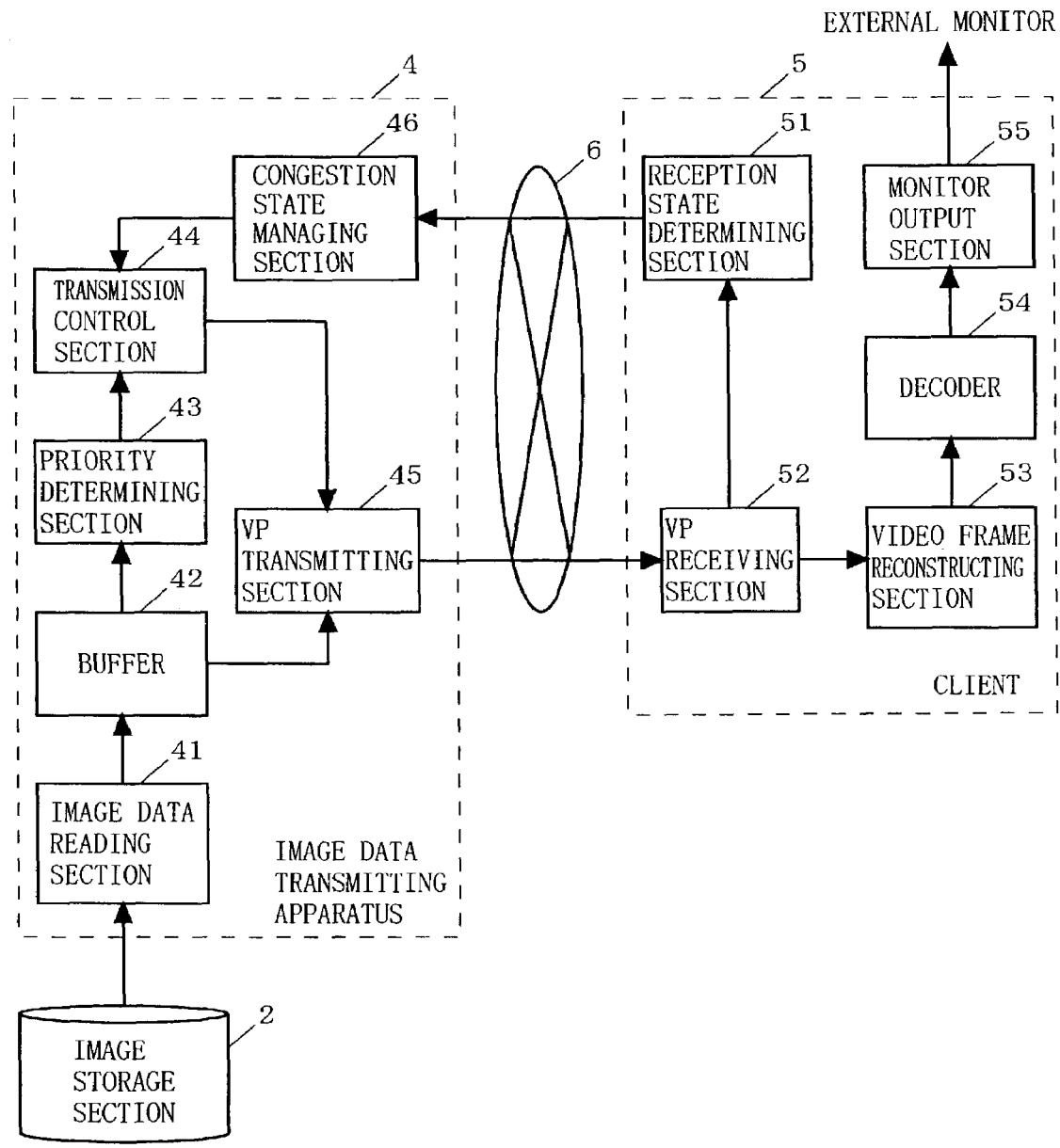
FIG. 3 is a block diagram illustrating the detailed structure of an image data transmitting apparatus 4 and a client 5 of FIG. 2.

With reference to FIG. 3, the outline of the image data transmitting apparatus 4 and the client 5 according to the first embodiment are first described below. FIG. 3 is a block diagram illustrating the detailed structures of the image data transmitting apparatus 4 and the client 5 illustrated in FIG. 2.

The image data transmitting apparatus 4 includes an image data reading section 41, a buffer 42, a priority determining section 43, a transmission control section 44, a VP transmitting section 45, and a congestion state managing section 46. The client 5 includes a reception state determining section 51, a VP receiving section 52, a video frame reconstructing section 53, a decoder 54, and a monitor output section 55.

In the image data transmitting apparatus 4, the image data reading section 41 reads from the image storage section 2 streaming image data, that is, encoded image data, requested by the client for sequential storage in the buffer 42. The buffer 42 temporarily stores the encoded image data.

The priority determining section 43 reads the encoded image data from the buffer 42 in units of VOP or GOV. From the read data, the priority determining section 43 then calculates a priority of each VP based on the amount of encoded data contained in the VP and the number of MBs included in the VP. A scheme for this calculation is described further below. Priority information calculated by the priority determining section 43 is reported together with identifiers assigned to the respective VPs to the transmission control section 44. These identifiers are assigned to the respective VPs typically based on the order of transmitting the VPs, time information for VOP synchronous reproduction, or the storage locations of the VPs in the image storage section 2.

The congestion state managing section 46 monitors the network 6 to report information about the state of congestion to the transmission control section 44. In the first embodiment, a case is exemplarily described in which the congestion state managing section 46 monitors information about the state of reception (reception data band or packet discarding ratio) transmitted from the client 5. Alternatively, the state of network 6 may be directly monitored.

The transmission control section 44 determines VPs to be transmitted to the client 5. This determination is made based on the information about the current state of congestion reported from the congestion state managing section 46 and the priority information of the respective VPs reported from the priority determining section 43. A scheme for this determination is described further below. The transmission control section 44 then reports to the VP transmitting section 45 about the identifiers of the VPs to be transmitted.

Based on the VP identifiers reported from the transmission control section 44, the VP transmitting section 45 obtains encoded image data of those VPs from the buffer 42. The VP transmitting section 45 then stores the obtained encoded image data in predetermined transmission packets constructing a video stream for sequential transmission to the client 5 via the network 6.

On the other hand, in the client 5, the VP receiving section 52 receives the video stream transmitted from the image data transmitting apparatus 4, and then extracts the encoded image data from the video stream. The extracted encoded image data is supplied to the video frame reconstructing section 53. The VP receiving section 52 also reports the amount of extracted encoded image data and sequential numbers assigned to the VPs (stored in a transmission header illustrated in FIG. 7, which will be described further below) to the reception state determining section 51. From the VPs supplied by the VP receiving section 52, the video frame reconstructing section 53 reconstructs the encoded image data in units of VOP corresponding to one frame.

The decoder 54 decodes and decompresses the encoded image data reconstructed by the video frame reconstructing section 53 to obtain non-compressed original image data. The monitor output section 55 converts the original image data obtained by the decoder 54 to image signals for supply to an external monitor (not shown). With this, the user of the client 5 can view a desired program on a real-time basis. The reception state determining section 51 receives the information about the amount of received encoded data and others from the VP receiving section 52 to calculate a current reception data band. The reception state determining section 51 then transmits the calculation results as the state of reception to the image data transmitting apparatus 4.

Figure 4:
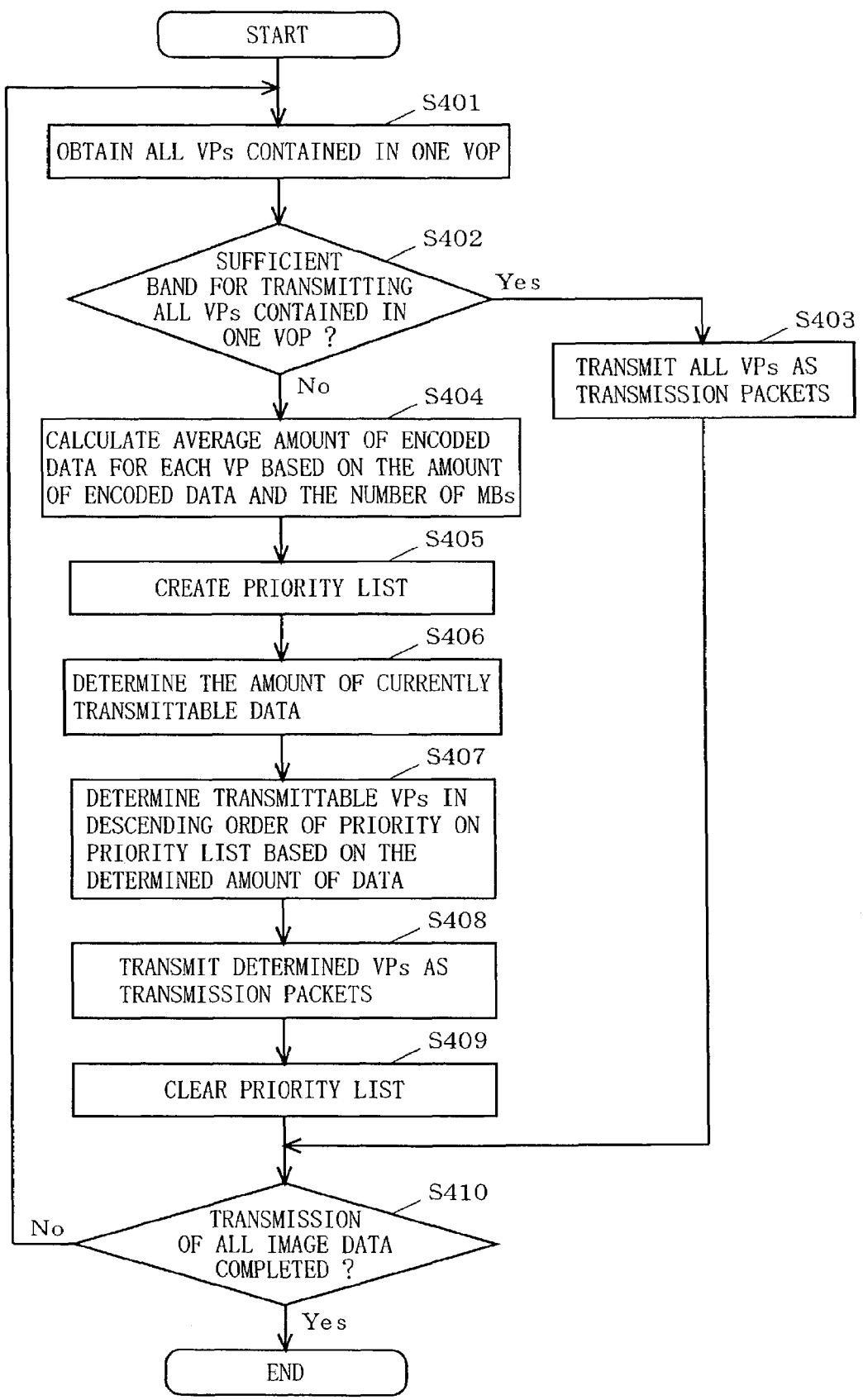
FIG. 4 is a flowchart showing one procedure of an image data transmitting method according to the first embodiment of the present invention.
Figure 7:
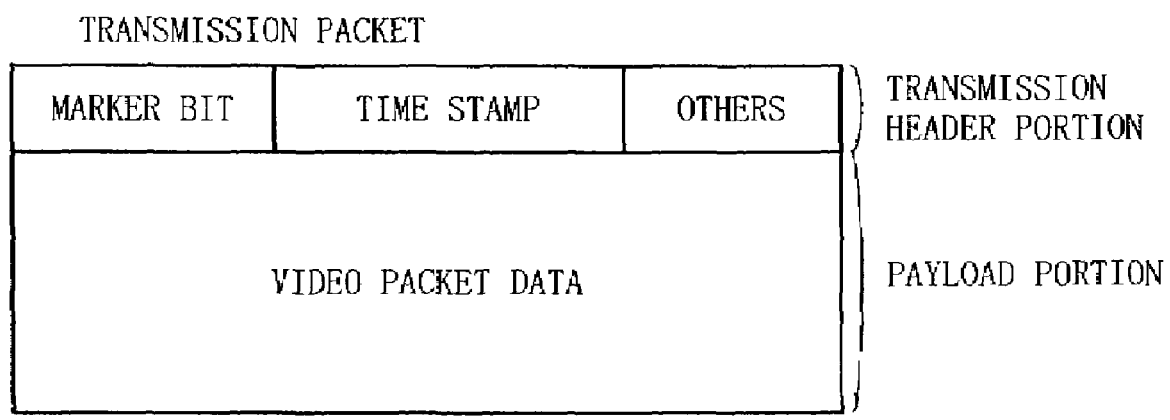
FIG. 7 is an illustration showing the structure of a transmission packet.

The detailed operation of the above-structured image data transmitting apparatus 4 is described below with reference to FIGS. 4 through 9. FIG. 4 is a flowchart showing the procedure of an image data transmitting method according to the first embodiment of the present invention. FIG. 5 is an illustration showing one exemplary case in which an average amount of encoded data is calculated for each VP. FIG. 6 is an illustration showing one example of a priority list created in units of VOP based on the average amount of encoded data of FIG. 5. FIG. 7 is an illustration showing the structure of a transmission packet generated by the VP transmitting section 45.

Once the encoded image data to be transmitted is stored in the buffer 42, the priority determining section 43 obtains all VPs contained in one VOP from the buffer 42 (step S401). This process of obtaining the unit of VOP is easily performed by determining whether a marker bit indicative of a boundary between VOPs is set in a VP or by determining whether the existence of the VOP header of the next VOP can be confirmed. The transmission control section 44 then determines whether the band on the network 6 for use in image data transmission is sufficient for transmitting all VPs contained in one VOP (step S402). That is, the transmission control section 44 checks the state of the band for use based on the information given by the congestion state managing section 46. If the band is sufficient (no congestion occurs), the VP transmission section 45 generates transmission packets for all VPs obtained by the priority determining section 43, and then transmits these packets to the client 5 (step S403).

Figure 25:
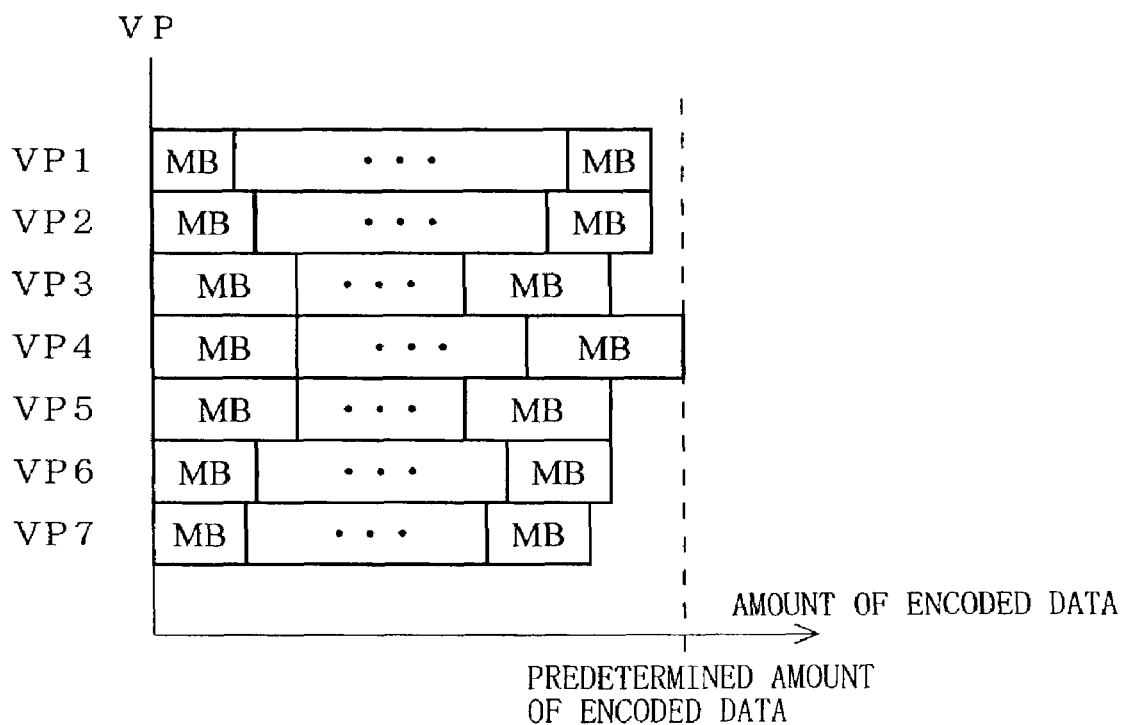
FIG. 25 is an illustration showing one example of the amount of encoded data for each VP of FIG. 23.

If the band is not sufficient (congestion occurs), on the other hand, the priority determining section 43 extracts the amount of encoded data and the number of MBs for each of the obtained VPs to calculate an average amount of encoded data (=the total amount of encoded data/the total number of MBs) (step S404). For example, the average amount of encoded data for each VP illustrated in FIG. 25 can be found as illustrated in FIG. 5. FIG. 5 shows examples of the amount of encoded data of each VP in kilobits (kbits) and the number of MBs. Based on the found average amounts of encoded data, the priority determining section 43 then creates a priority list containing a transmission priority given to each VP in descending order of the average amount of encoded data (step S405). With this priority list, it is also possible to find an accumulated amount of encoded data in descending order of priority. The priority list created based on FIG. 5 is as illustrated in FIG. 6. The priority order of VPs having the same average amount of encoded data can be determined based on, for example, their locations in the VOP.

Next, the transmission control section 44 determines the amount of data currently transmittable over the network 6 based on the information about the state of congestion obtained by the congestion state managing section 46 (step S406). The transmission control section 44 then refers to the created priority list to determine VPs starting from the head VP on the priority list that have a data amount up to the determined amount of transmittable data as transmittable VPs (step S407). For example, in the case of the priority list illustrated in FIG. 6, when the amount of transmittable data is 400 kbits, four VPs of VP4, VP3, VP5, and VP2 are determined as the transmittable VPs.

Alternatively, the transmittable VPs can also be determined by representing each accumulated amount of data on the priority list by a transmission rate per second (kbps) and determining the image transfer rate by the transmission control section 44. In this case, the number of VOPs per second (fps) should be considered. For example, when the number of VOPs per second is 10 fps, each accumulated amount of data on the priority list is multiplied by 10.

The VP transmitting section 45 generates transmission packets for the determined VPs for transmission to the client 5 (step S408). Each transmission packet is structured by, as illustrated in FIG. 7, a transmission header including a marker bit, a time stamp, and other management information, and a payload portion for storing VP data. Upon transmitting the transmission packets to the client 5, the transmission control section 44 clears the priority list (step S409). The above-described processes S401 through S409 are repeatedly performed in order to process the image data to be transmitted in units of VOP (step S410).

With these processes, the image data transmitting apparatus 4 can control data transmission at a transfer rate in accordance with the state of congestion on the network 6.

Figure 8:
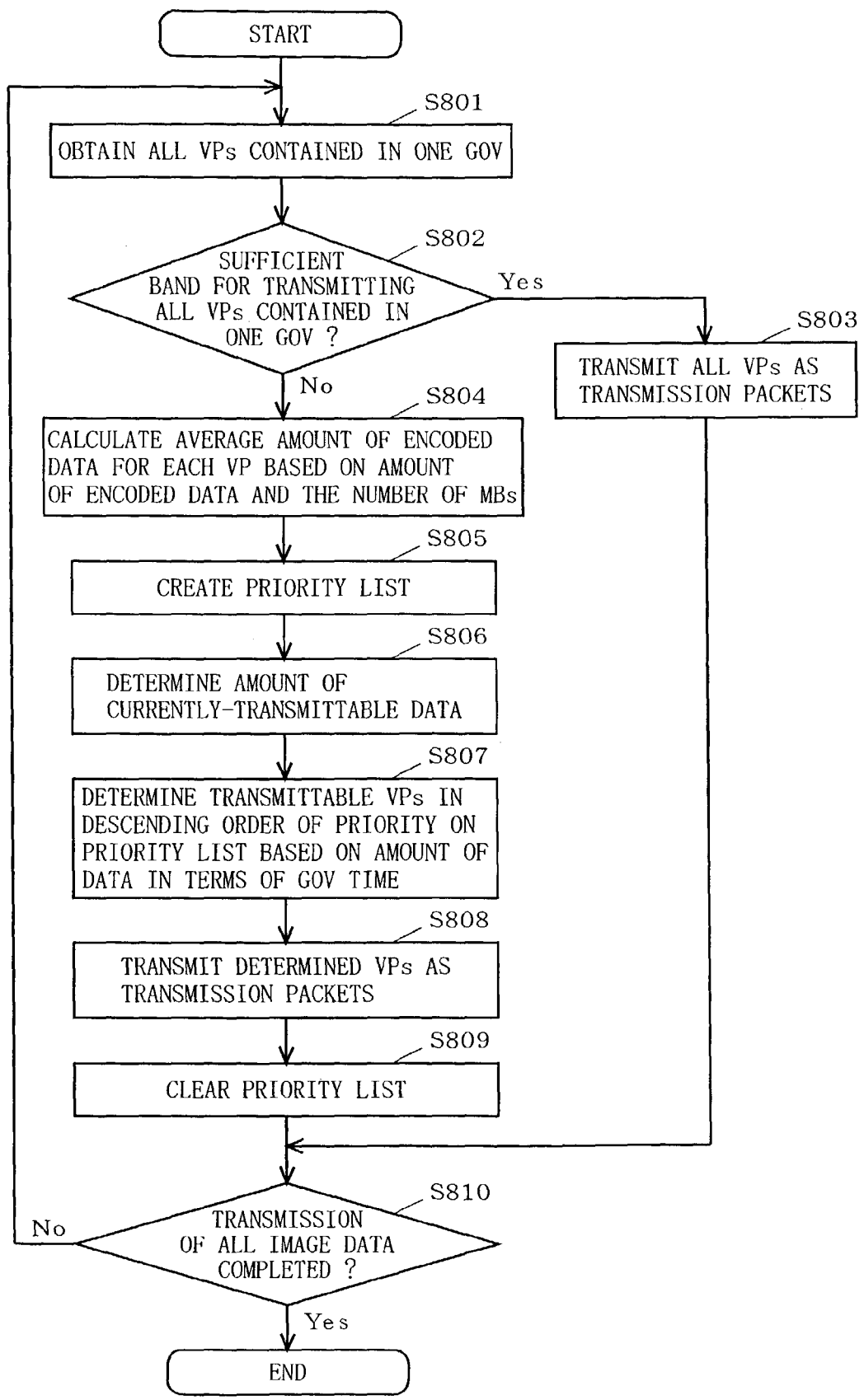
FIG. 8 is a flowchart showing another procedure of the image data transmitting method according to the first embodiment of the present invention.
Figure 21:
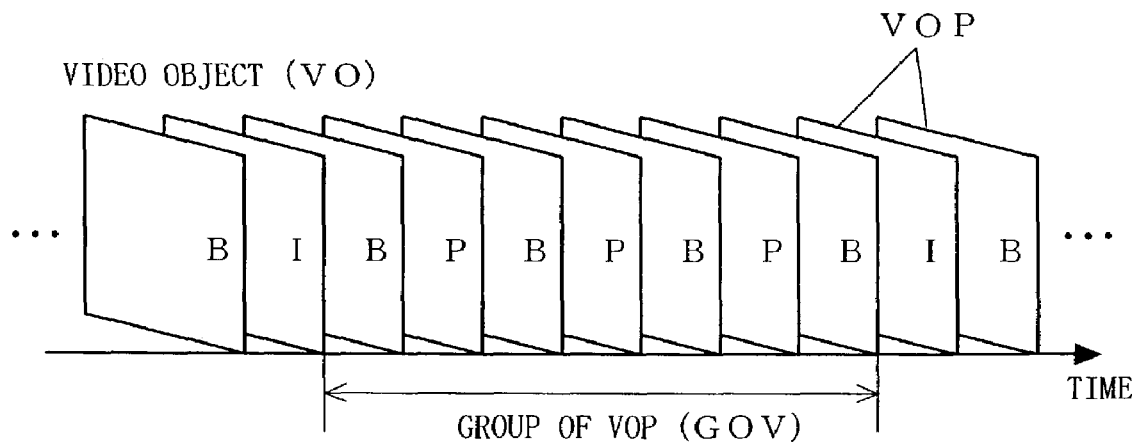
FIG. 21 is an illustration for describing the structure of an VO based on MPEG-4.

In the above example, a case has been described in which the priority of each VP contained in one VOP is determined. Alternatively, the priority of each VP of all VOPs contained in one GOV can be determined (refer to FIG. 21). FIG. 8 is a flowchart showing another procedure of the image data transmitting method according to the first embodiment of the present invention. FIG. 9 is an illustration showing one example of a priority list generated in units of GOV.

When the encoded image data to be transmitted is stored in the buffer 42, the priority determining section 43 obtains all VPs contained in a plurality of VOPs forming one GOV from the buffer 42 (step S801). This process of obtaining the unit of GOV is easily performed by determining whether the existence of the VOP header of an I-VOP can be confirmed. The transmission control section 44 then determines whether the band on the network 6 for use in image data transmission is sufficient for transmitting all VPs contained in those VOPs forming one GOV (step S802). If the band is sufficient (no congestion occurs), the VP transmission section 45 generates transmission packets for all of the obtained VPs for transmission to the client 5 (step S803).

If the band is not sufficient (congestion occurs), on the other hand, the priority determining section 43 extracts the amount of encoded data and the number of MBs for each of the VPs of the obtained GOV to calculate an average amount of encoded data (=the total amount of encoded data/the total number of MBs) (step S804). Based on the found average amounts of encoded data, the priority determining section 43 then creates a priority list containing a transmission priority given to each VP in descending order of the average amount of encoded data (step S805). With this priority list, it is also possible to find an accumulated amount of encoded data in descending order of VP priority. One example of such a priority list created in this case is illustrated in FIG. 9.

Next, the transmission control section 44 determines the amount of data currently transmittable over the network 6 based on the information about the state of congestion obtained by the congestion state managing section 46 to calculate the amount of data in terms of a GOV time (step S806). The GOV time is a time period in which transmission of all VOPs forming one GOV should be completed, that is, an allowable delay time. Consider a case, for example, in which the number of VOPs per second is 10 fps, the GOV time is five seconds, and the amount of transmittable data is 400 kbits per VOP. In this case, the amount of data in terms of the GOV time is 20000 (=10×5×400) kbits. The transmission control section 44 then refers to the created priority list to determine VPs starting from a head VP on the priority list that have a data amount up to the amount of data in terms of the above GOV time as transmittable VPs (step S807).

Alternatively, each accumulated amount of data on the priority list may be divided by the GOV time to obtain a value, that is, a transfer allowable rate per second, and VPs starting from the head VP on the priority list that have a transfer rate up to a transfer rate currently allowing image data transmission may be determined as the transmittable VPs.

The VP transmitting section 45 generates transmission packets for the determined VPs for transmission to the client 5 (step S808). Upon transmitting the transmission packets to the client 5, the transmission control section 44 clears the priority list (step S809). The above-described processes S801 through S809 are repeatedly performed in order to process the image data to be transmitted in units of GOV (step S810).

With these processes, the image data transmitting apparatus 4 can control data transmission at a transfer rate in accordance with the state of congestion on the network 6.

Figure 10:
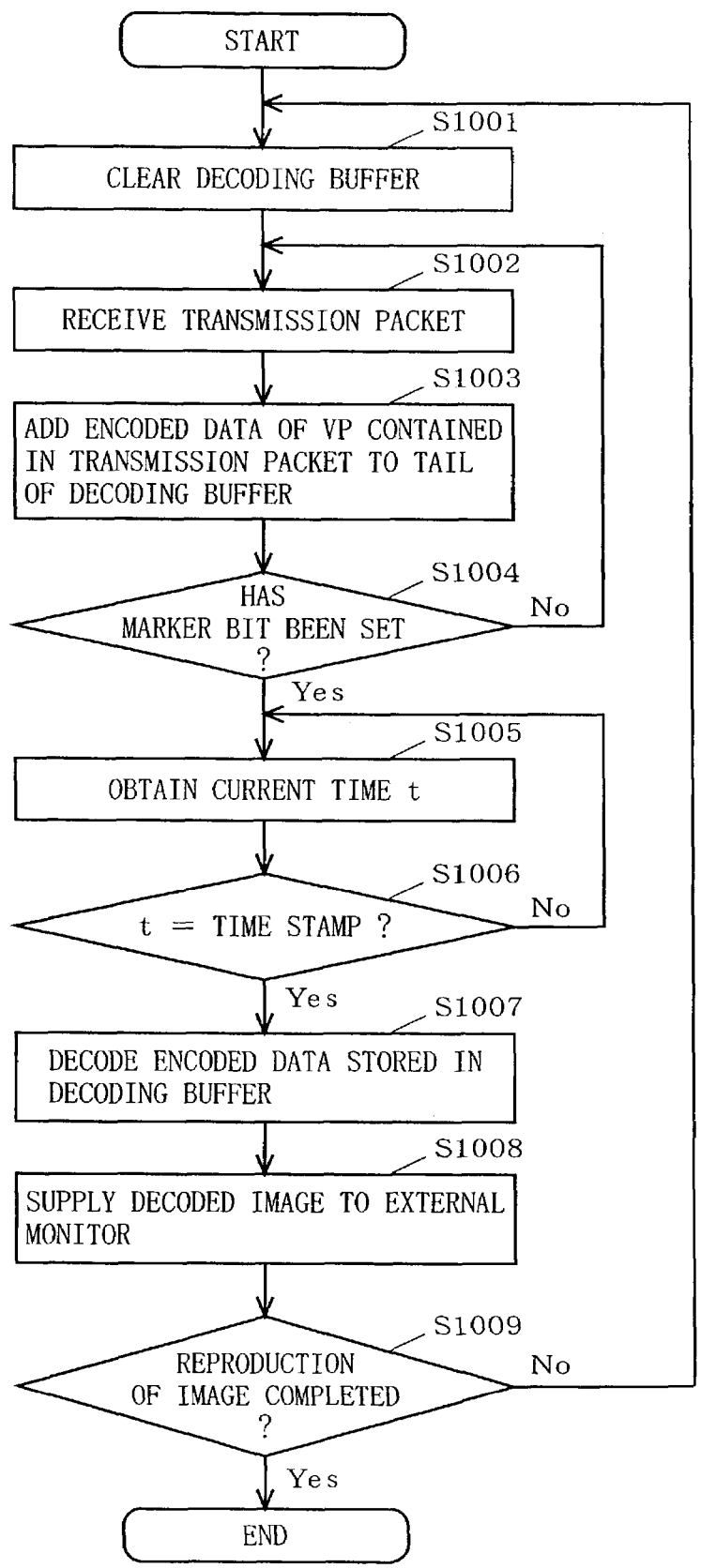
FIG. 10 is a flowchart showing the procedure carried out by the client 5 illustrated in FIG. 2.

The detailed operation of the client 5 is described below with reference to FIG. 10. FIG. 10 is a flowchart showing the procedure performed by the client according to the first embodiment of the present invention.

First, the video frame reconstructing section 53 clears a decoding buffer (not shown) incorporated therein (step S1001). The video VP receiving section 52 then receives a transmission packet transmitted from the image data transmitting apparatus 4 via the network 6 (step S1002). The video frame reconstructing section 53 then adds the encoded image data stored in the payload portion of the transmission packet (refer to FIG. 7) to the tail of the decoding buffer (step S1003). The video frame reconstructing section 53 then checks whether the marker bit of the transmission packet has been set (step S1004). If the marker bit has been not set, the VP receiving section 52 receives the next transmission packet.

If the marker bit has been set, the video frame reconstructing section 53 obtains a current time t (step S1005). The video frame reconstructing section 53 then checks whether the obtained current time t approximately coincides with the time indicated by the time stamp included in the transmission packet (step S1006). If both times coincide with each other, the decoder 54 decodes the encoded data stored in the decoder buffer of the video frame reconstructing section 53 (step S1007). The decoder 54 then supplies an image based on the decoded image data to the external monitor via the monitor output section 55 (step S1008).

The above processes in step S1001 through S1008 are repeatedly performed until reproduction of all images is completed (step S1009). With these processes, the client 5 can sequentially receive the VPs to reproduce images obtained from the VPs on the external monitor.

As described above, according to the image data transmitting apparatus and method of the first embodiment of the present invention, the priority of each VP is determined based on the average amount of encoded data obtained by dividing the amount of encoded data by the number of MBs. This determination is based on the fact that, in an area containing a large motion, which has a great impact on the image, the amount of encoded data per MB is large. Based on the determination results, the VPs are transmitted in descending order of the average amount of encoded data. Thus, under the circumstances in which the image data transfer rate has to be decreased at the time of congestion on the network, for example, the transfer rate can be optimized, and degradation in image quality can be mitigated. Particularly, without determining the degree of importance and the order of priority of moving images by using motion information, the image data transmitting apparatus can control the transfer rate by discarding packets based on the amount of encoded data to be transmitted. Also, the image data transmitting apparatus approximately equates the amounts of encoded data of the VPs. Therefore, influences due to transfer error can be more localized, thereby reinforcing error resistance.

Furthermore, the client 5 calculates the current reception data band, and then reports the calculation results to the image data transmitting apparatus 4. Therefore, even when congestion occurs on the network 6, transmission and reception of video streams can be performed in a transmission band suitable to the state of congestion.

Depending on the type of encoder 1, the encoded VP may be made in a transmission packet format to be stored in the image storage section 2, and there may be a transmission packet in which a VOP header and an arbitrary VP are packetized together in advance. In such a case, for the purpose of achieving stable image replay at the client side 5, the transmission packet containing a VOP header is prioritized for transmission to the client 5, irrespectively of the priority given to the VP contained in the same transmission packet.

In the above first embodiment, the amount of transmittable image data (VPs) is determined based on the state of the network. This is not meant to be restrictive. Alternatively, for example, the amount of transmittable image data can be determined based on the state of use of a bus (PCI bus, for example) externally or internally provided to the image data transmitting apparatus for image data transmission. Still alternatively, the amount of transmittable image data can be determined based on the state of load to the CPU in the image data transmitting apparatus or the client.

Second Embodiment

Figure 11:
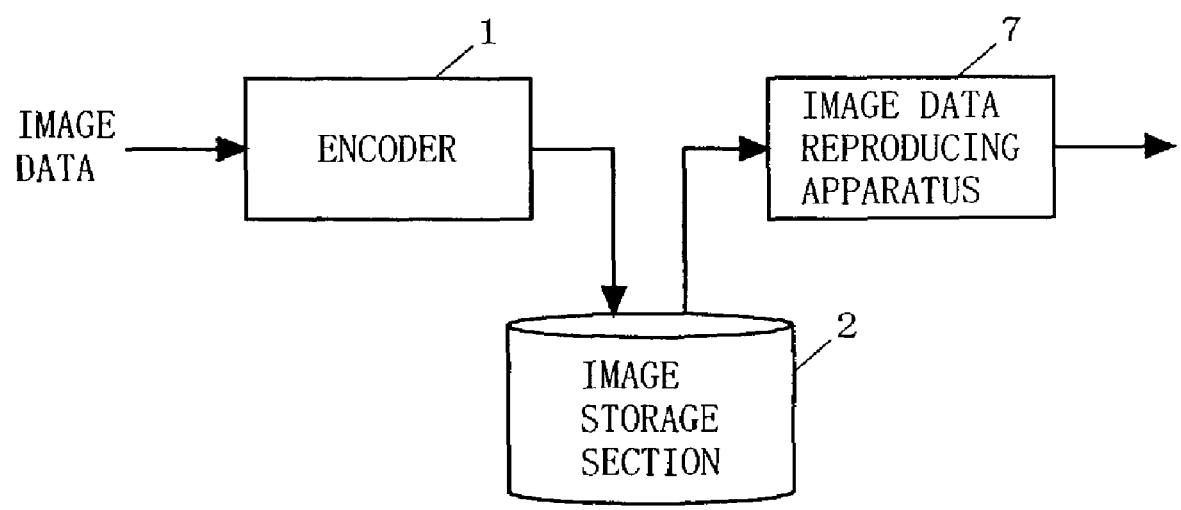
FIG. 11 is an illustration showing the configuration of a system including an image data reproducing apparatus according to a second embodiment of the present invention.

FIG. 11 is an illustration showing the configuration of a system including the image data reproducing apparatus according to the second embodiment of the present invention. As illustrated in FIG. 11, the system according to the second embodiment is configured so that the image data processing section 3 illustrated in FIG. 1 is implemented by an image data reproducing apparatus 7 for reproducing encoded moving picture data stored in the image storage section 2. This image data reproducing apparatus 7 can be any as long as it can reproduce images from encoded image data recorded on a medium, such as a DVD recorder or a personal computer capable of recording images. The second embodiment of the present invention is described below, focusing on the image data reproducing apparatus 7.

Figure 12:
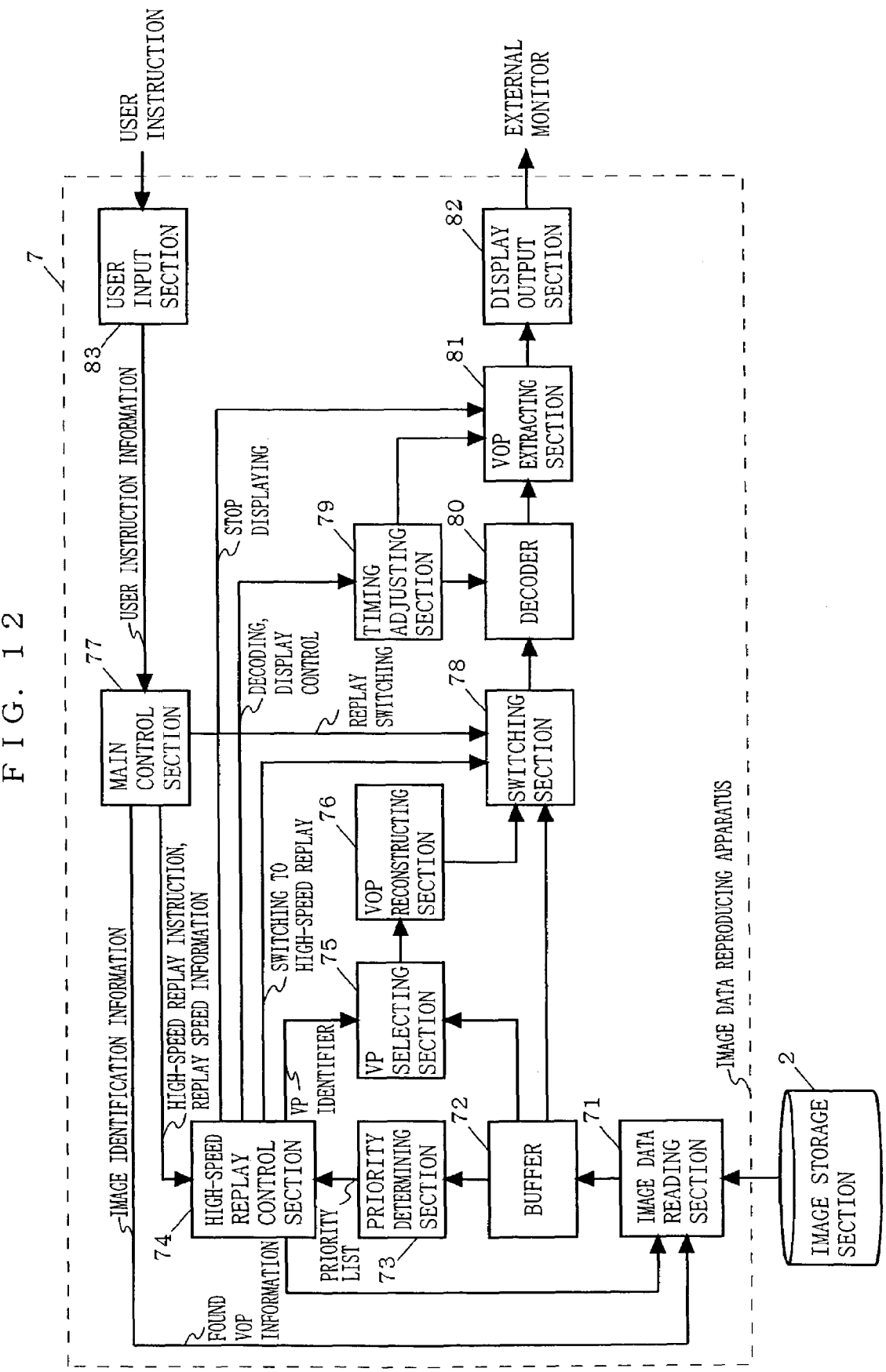
FIG. 12 is a block diagram showing the detailed structure of an image data reproducing apparatus 7 of FIG. 11.

First, with reference to FIG. 12, an outline of the image data reproducing apparatus 7 according to the second embodiment is described. FIG. 12 is a block diagram illustrating the detailed structure of the image data reproducing apparatus 7 of FIG. 11.

The image data reproducing apparatus 7 includes an image data reading section 71, a buffer 72, a priority determining section 73, a high-speed replay control section 74, a VP selecting section 75, a VOP reconstructing section 76, a main control section 77, a switching section 78, a timing adjusting section 79, a decoder 80, a VOP extracting section 81, a display output section 82, and a user input section 83. The timing adjusting section 79, the decoder 80, the VOP extracting section 81, and the display output section 82 collectively serve as a replay section for image replay.

The user input section 83 is implemented by a remote controller, a key board, or the like, serving as a user interface for receiving various instructions given by user's operations to the image data reproducing apparatus 7. The user input section 83 forwards instructions from the user to the main control section 77 as user instruction information. The main control section 77 instructs the relevant component to perform a process in accordance with the user instruction information, and also gives information necessary for the process to the relevant component. The necessary information includes, for example, image identification information for searching the image storage section 2 for a particular image, and replay speed information about a speed for replaying images. By way of example, when the user instruction information indicates "double-speed replay of image X", the main control section 77 gives image identification information for reading image X from the image storage section 2 and image speed information for doubling the replay speed. The main control section 77 controls the entire image processing, such as replay, stop, and fast-forward, based on the instructions fed by the user input section 83. In the following, however, descriptions are made only to an image replay process, which is a feature of the present invention.

In response to the instructions and the image identification information given by the main control section 77, the image data reading section 71 reads encoded image data from the image storage section 2, and then sequentially stores the read data in the buffer 72. Also, the image data reading section 71 does the same in response to an instruction given by the high-speed replay control section 74, which is described further below. The buffer 72 temporarily stores the encoded image data in units of VOP or GOV.

The priority determining section 73 reads the encoded image data from the buffer 72 for each P-VOP and B-VOP. The priority determining section 73 then calculates a priority of each VP for each P-VOP and B-VOP based on the information obtained from the read data, including the amount of encoded data and the number of MBs contained in each VP. A scheme for this priority calculation has been described in the above first embodiment. The priority information calculated by the priority determining section 43 is forwarded together with the identifiers of the VPs to the high-speed replay control section 74.

Upon receiving an instruction for high-speed replay from the main control section 77, the high-speed replay control section 74 determines VPs usable for high-speed replay based on the replay-speed information given by the main control section 77 and the VP priority information fed by the priority determining section 73. A scheme for this determination is described further below. The high-speed replay control section 74 then reports the identifiers of the VPs usable for high-speed replay to the VP selecting section 75. The high-speed replay control section 74 also performs a control in accordance with the replay speed based on the replay speed information and a control at the time of stopping high-speed replay over the switching section 78, the timing adjusting section 79, and the VOP extracting section 81.

Based on the VP identifiers fed by the high-speed replay control section 74, the VP selecting section 75 selects and obtains the encoded image data of the VPs usable for high-speed replay from the buffer 72 for supply to the VOP reconstructing section 76. The VOP reconstructing section 76 receives the selected VPs from the VP selecting section 75, and then reconstructs a VOP for high-speed replay by using these VPs.

The switching section 78 selectively switches the VOPs to be obtained depending on normal image replay or high-speed image replay. Specifically, upon receiving an instruction for normal replay from the main control section 77, the switching section 78 obtains the original VOPs from the buffer 72 for supply to the decoder 80. Upon receiving an instruction for high-speed replay from the main control section 77, on the other hand, the switching section 78 obtains the original I-VOPs from the buffer 72 and the reconstructed P-VOPs and B-VOPs from the VOP reconstructing section 76, and then supplies these obtained VOPs to the decoder 80.

The decoder 80 receives these VOPs from the switching section 78 to encode and decompress the encoded image data for conversion to the non-compressed original image data. The timing adjusting section 79 generates a timing signal based on the control information given by the high-speed replay control section 74 for performing a decoding process for normal replay or high-speed replay, and then supplies the timing signal to the decoder 80. The timing adjusting section 79 also generates a timing signal based on the control information given by the high-speed replay control section 74 for extracting predetermined image data, and then supplies the timing signal to the VOP extracting section 81.

The VOP extracting section 81 extracts the predetermined image data in units of VOP based on the timing signal supplied by the timing adjusting section 79. The VOP extracting section 81 also performs a process at the time of ending high-speed replay based on the instruction from the high-speed replay control section 74. The display output section 82 converts the image data extracted by the VOP extracting section 81 to image signals for display on a monitor or the like. Note that the encoded image data usually include audio data and therefore, needless to say, the image data reproducing apparatus of the present invention can also perform audio data processing.

Figure 13:
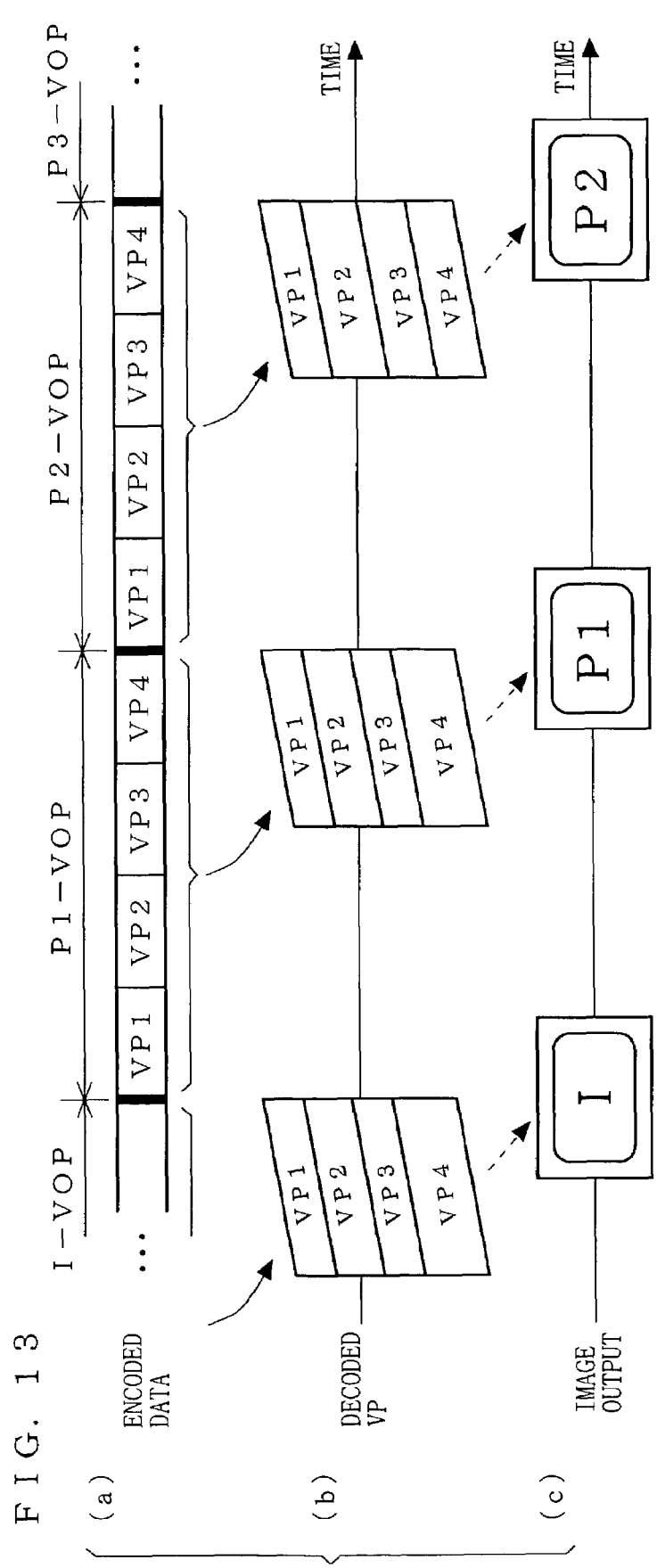
FIG. 13 is an illustration for describing the operation carried out by the image data reproducing apparatus 7 at normal replay.
Figure 14:
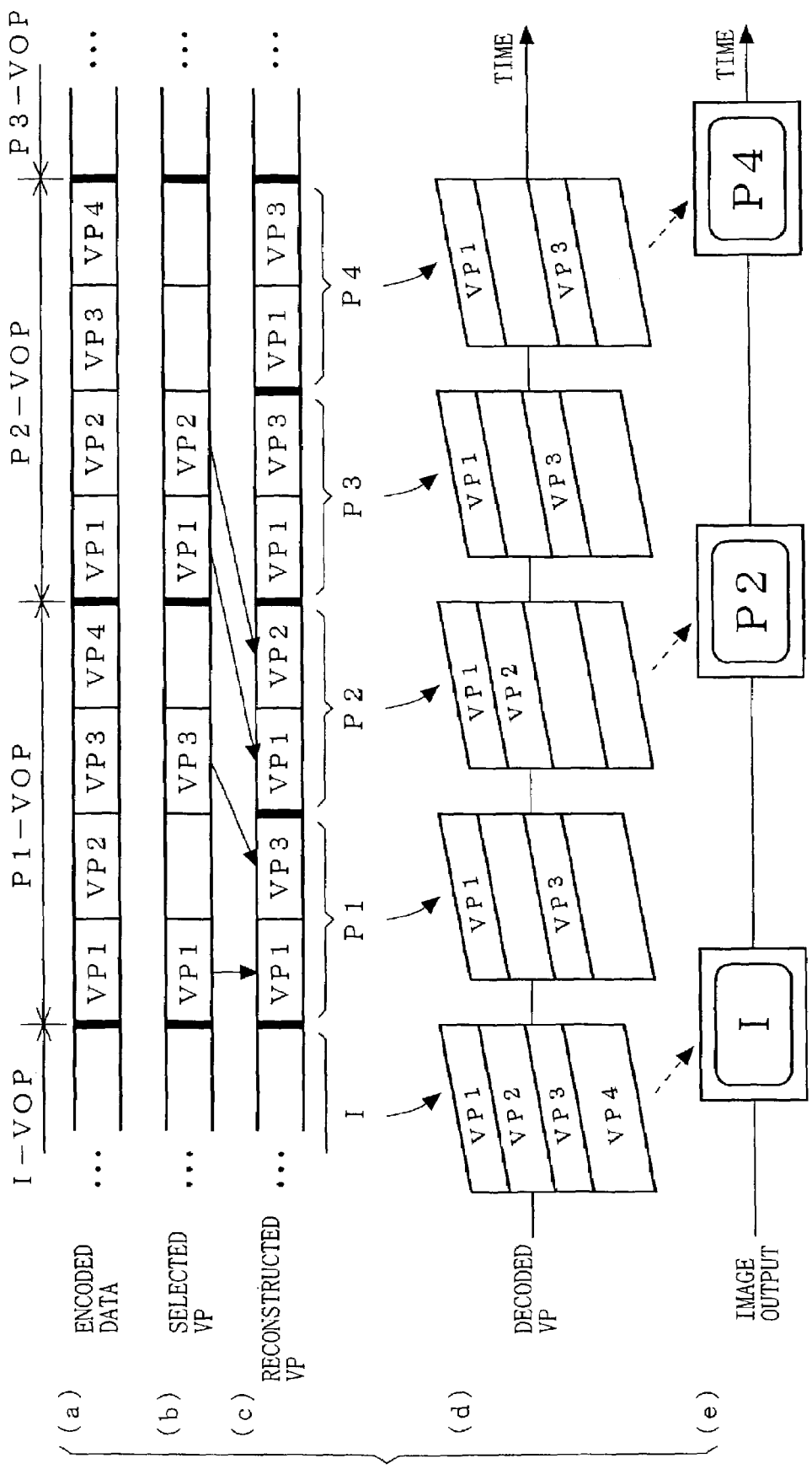
FIG. 14 is an illustration for describing the operation carried out by the image data reproducing apparatus 7 at high-speed replay.

The detailed operation of the above-structured image data reproducing apparatus 7 is described below with reference to FIGS. 13 through 16. FIG. 13 is an illustration for describing the operation performed by the image data reproducing apparatus 7 at the time of normal replay. FIG. 14 is an illustration for describing the operation performed by the image data reproducing apparatus 7 at the time of high-speed (double-speed) replay. FIGS. 13 and 14 are exemplary cases where I-VOP, P1-VOP, and P2-VOP are read from the image storage section 2, and each VOP is composed of VP1 through VP4 whose amounts of encoded data are approximately equal to each other.

First, normal replay is described. When an instruction for normal replay of a specific image comes through the user input section 83, the main control section 77 gives the image identification information of the specific image to the image data reading section 71. With this, the encoded data of the specific image is sequentially read from the image storage section 2 in units of VOP, and is then stored in the buffer 72 (refer to (a) of FIG. 13). The encoded image data stored in the buffer 72 is supplied via the switching section 78 to the decoder 80. From the encoded image data of all VPs composing I-VOP, the decoder 80 generates non-compressed image data for one frame. Similarly, from the encoded data of all VPs composing P1-VOP and those composing P2-VOP, the decoder 80 generates non-compressed image data for one frame (refer to (b) of FIG. 13). The display output section 82 converts the generated, non-compressed image data to image signals for supply to the monitor, for example. Thus, images are sequentially displayed on the monitor in units of VOP, leading to normal replay of moving images (refer to (c) of FIG. 13).

Next, high-speed replay is described below. When an instruction for double-speed replay of a specific image comes through the user input section 83, the main control section 77 gives the image identification information of the specific image to the image data reading section 71. Also, the main control section 77 gives the high-speed replay control section 74 the replay speed information and an instruction for high-speed replay. With this, the encoded data of the specific image is sequentially read from the image storage section 2 in units of VOP, and is then stored in the buffer 72 (refer to (a) of FIG. 14). Of the encoded image data stored in the buffer 72, each VP composing P-VOPs and B-VOPs is given a priority by the priority determining section 73. Based on the replay-speed information from the main control section 77 and the priority information from the priority determining section 73, the high-speed replay control section 74 determines VPs usable for high-speed replay from out of P-VOPs and B-VOPs (refer to (b) of FIG. 14).

A case is illustrated in (b) of FIG. 14 in which VP1 and VP3 are determined as VPs having a high priority from out of P1-VOP, while VP1 and VP2 are determined as such from of P2-VOP. When N-fold high speed replay is performed, VPs are determined as those usable for high-speed replay so as to have approximately 1/N of the total amount of encoded data contained in one VOP. A scheme for this determination is described in detail further below. By using these determined VPs, VOPs for high-speed replay are reconstructed by the VOP reconstructing section 76 (refer to (c) of FIG. 14).

The I-VOPs and the reconstructed P-VOPs and B-VOPs are supplied via the switching section 78 to the decoder 80. That is, when an I-VOP is to be processed, the encoded image data of the I-VOP is supplied from the buffer 72 to the decoder 80. When a P-VOP or a B-VOP is to be processed, the encoded image data thereof is supplied from the VOP reconstructing section 76 to the decoder 80. Then, for the I-VOP, the decoder 80 generates non-compressed image data from all VPs constructing the I-VOP. For the P-VOP or the B-VOP, the decoder 80 generates reconstructed, non-compressed image data composed only of VPs having a high priority.

For example, the image data for P1-VOP is generated only from VP1 and VP3, while the image data for P2-VOP is generated only from VP1 and VP2 (refer to (d) of FIG. 14). Therefore, in image processing, only these VPs of high priorities are updated from those of the previous image. As such, the number of VPs for use in reconstructing one VOP is reduced, there by making it possible to generate image data for high-speed replay even when the processing capability of the decoder 80 is limited (only capable of decoding at normal speed).

From out of the pieces of image data in units of VOP generated at double speed, the VOP extracting section 81 extracts alternating pieces of image data for supply to the display output section 82. That is, as illustrated in (e) of FIG. 14, in double-speed replay, the display rate is the same as that in normal replay, but the interval of image output of each VOP is different from that in normal replay. Specifically, for example, image output is performed in the order of I, P1, and then P2 in normal replay as illustrated in (c) of FIG. 13, in contrast to the order of I, P2, and then P4 in double-speed replay as illustrated in (e) of FIG. 14. In other words, moving images are output at double speed in (e) of FIG. 14.

Normally, the display device, such as a monitor, has a fixed display rate, that is, a fixed synchronizing frequency. Therefore, in N-fold-speed replay, a process of extracting once every N VOPs is performed by the VOP extracting section 81. However, if the display rate is not fixed, the image data reproducing apparatus can be structured so as to display images of all VOPs reconstructed by the VOP reconstructing section 76 without using the VOP extracting section 81.

Figure 15:
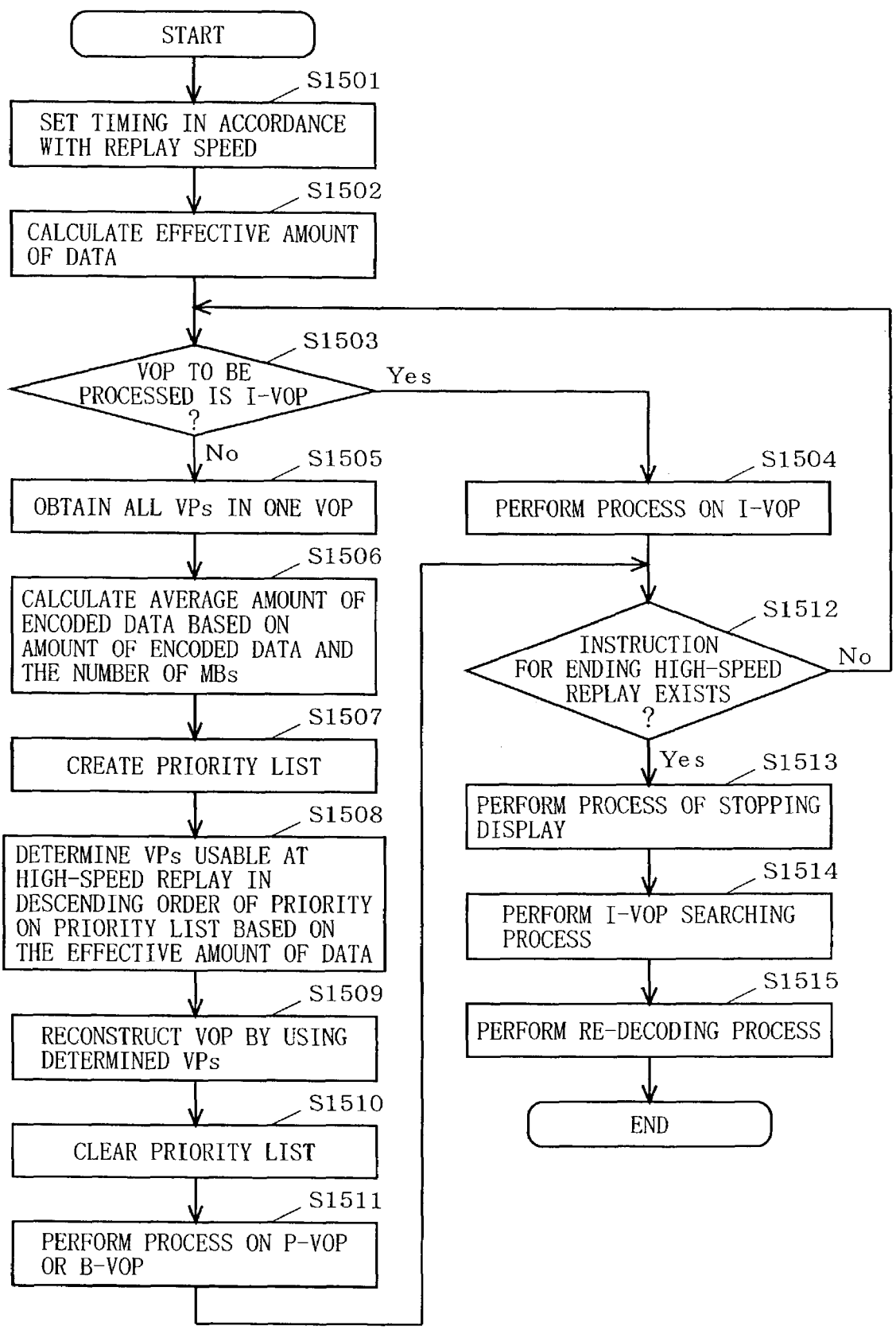
FIG. 15 is a flowchart showing the procedure of an image data reproducing method according to the second embodiment of the present invention.
Figure 16:
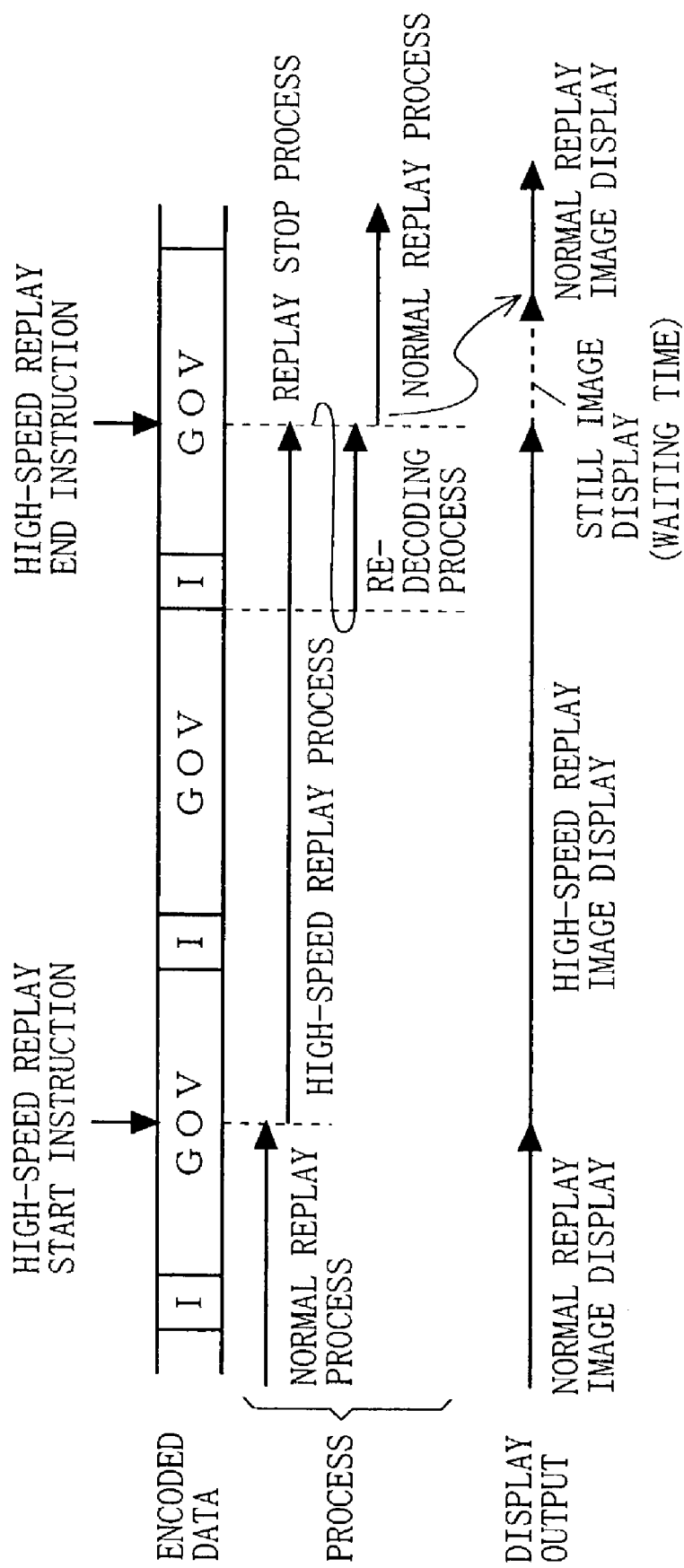
FIG. 16 is an illustration for describing the operation carried out by the image data reproducing apparatus 7 of FIG. 12 when making a transition from high-speed replay to normal replay.

Next, with reference to FIGS. 15 and 16, the procedure performed by the image data reproducing apparatus 7 for performing the above-described high-speed replay process is described below. FIG. 15 is a flowchart showing the procedure performed by the image data reproducing apparatus according to the second embodiment of the present invention. FIG. 16 is an illustration showing the operation carried out by the image data reproducing apparatus 7 when making a transition from high-speed replay to normal replay.

Upon provision of an instruction for high-speed replay supplied from the main control section 77 to the high-speed replay control section 74, the high-speed replay process illustrated in FIG. 15 is started. First, based on the replay speed information supplied by the main control section 77 together with the high-speed replay instruction, the high-speed replay control section 74 instructs the timing adjusting section 79 to set timing according to the replay speed (step S1501). Then, the high-speed replay control section 74 calculates the amount of encoded data to be supplied to the VOP reconstructing section 76 for each VOP as an effective amount of data (step S1502). The effective amount of data can be calculated by, for example, dividing an amount A of encoded data per VOP at normal replay by a replay speed B (=A/B). This effective amount of data is used as a threshold for selecting VPs in the order of priority.

The high-speed replay control section 74 determines whether a VOP for high-speed replay is an I-VOP (step S1503). If the VOP is an I-VOP, a process of generating image data from all VPs constructing the I-VOP is performed in the image data reproducing apparatus 7 (step S1504). If the VOP is a P-VOP or a B-VOP, on the other hand, the priority determining section 73 obtains all VPs for one VOP from the buffer 72 (step S1505). The priority determining section 73 then extracts the number of MBs contained in each VP and the amount of encoded data for each VP to calculate the average amount of encoded data (step S1506, refer to FIG. 5). In accordance with the calculated average amount of encoded data, the priority determining section 73 then creates a priority list in which a higher replay priority is given in the order of VPs having more average amount of encoded data (step S1507, refer to FIG. 6).

The high-speed replay control section 74 then refers to the created priority list to determine VPs starting from the head VP on the priority list that have a data amount up to the effective amount of data as VPs for use in replay (step S1508). For example, when the amount A of encoded data is 600 kbits and the replay speed is double speed, the effective amount of data is 300 (=600/2) kbits. Therefore, in the priority list illustrated in FIG. 6, three VPs of VP4, VP3, and VP5 are determined as the VPs for use in replay. The determined VPs are supplied from the buffer 72 to the VOP reconstructing section 76, where these VPs are reconstructed to form a VP for high-speed replay (step S1509). At this time, the priority list is cleared (step s1510). Upon reconstruction of the VOP, a process for generating image data from VPs forming the VOP is performed (step S1511).

When the above process on one VOP is completed, the high-speed replay control section 74 determines whether there is an instruction for ending currently-performed high-speed replay (step S1512). If there is no such instruction, the high-speed replay control section 74 returns to step S1503 to perform a replay process on the next VOP. If there is such an instruction, the high-speed replay control section 74 instructs the VOP extracting section 81 to perform a display end process. In response to this instruction, the VOP extracting section 81 temporarily stops image data extraction, and then performs a process for supplying image data at the time of receiving the high-speed replay end instruction to the display output section 82 as a still image (step S1513). Then, the high-speed replay control section 74 instructs the image data reading section 71 to search for an I-VOP located at the head of a GOV being processed at the time of the end instruction. In response to this instruction, the image data reading section 71 searches for the above-mentioned I-VOP, and then reads the found I-VOP for storage in the buffer 72 (step S1514).

The high-speed replay control section 74 then instructs the switching section 78 to select the encoded image data of the I-VOP from the buffer 72. The high-speed replay control section 74 also instructs the timing adjusting section 79 to generate a timing signal for re-decoding, and instructs the decoder 80 to perform re-decoding and re-decompression. With these instructions, the timing adjusting section 79 generates the timing signal for re-decoding and, based on the timing signal, the decoder 80 performs the re-decoding process (step S1515). With these processes in step S1513 through S1515, the high-speed replay control section 74 performs switching from high-speed replay to normal speed replay.

FIG. 16 illustrates a relation on the time axis among video objects (VOs), the above-described processes performed at the time of switching from high-speed replay to normal replay, and images output from the display output section 82 after these processes.

As illustrated in FIG. 16, upon reception from the user of an instruction for starting high-speed replay during normal replay, the image data reproducing apparatus 7 starts the high-speed replay process illustrated in FIG. 15. Then, upon reception from the user of an instruction for ending high-speed replay, the image data reproducing apparatus 7 performs a display end process and a re-decoding process. These processes are performed in order to prevent a problem in which a transition to normal replay immediately after the reception of the instruction for ending high-speed replay would cause image replay to be performed with VPs of low priorities that have been discarded by the VOP reconstructing process being lost.

The image data reproducing apparatus 7 displays an image of a VOP at the time of receiving the instruction for ending high-speed replay as a still picture. Then, going back from that VOP to an I-VOP of a reference image, the image data reproducing apparatus 7 performs a process of re-decoding and re-decompressing encoded data of these VOPs starting from that I-VOP. Then, the image data reproducing apparatus 7 sequentially generates images for normal replay based on the re-decoded and re-decompressed image data after the time of the high-speed replay end instruction. In this way, images of VOPs after the time of the high-speed replay end instruction are normally replayed without degradation in image quality.

In the display stop process and the re-decoding process described with reference to FIG. 16, the process of re-decoding and re-decompressing has to be performed on the VOPs starting from the I-VOP of the reference image through the VOP at the time of receiving the high-speed replay end instruction. This causes a waiting time until replay goes back from high-speed replay to normal replay. For reduction of such a waiting time, normal replay of VOPs after the time of the high-speed replay end instruction without degradation in image quality can be discarded, in some cases. One exemplary scheme for reducing the waiting time is to add a function described below.

The function to be added is to detect a remaining time (or the number of remaining VOPs) from the time of the high-speed replay end instruction until the time when the next I-VOP comes, and then to determine whether the remaining time is within a predetermined time period (or whether the number of remaining VOPs is within a predetermined number of VOPs). If the remaining time is over the predetermined time period, the processing described with reference to FIG. 16 is performed. Otherwise, images are sequentially generated at normal replay with part of VPs being lost until the next I-VOP comes.

Figure 17:
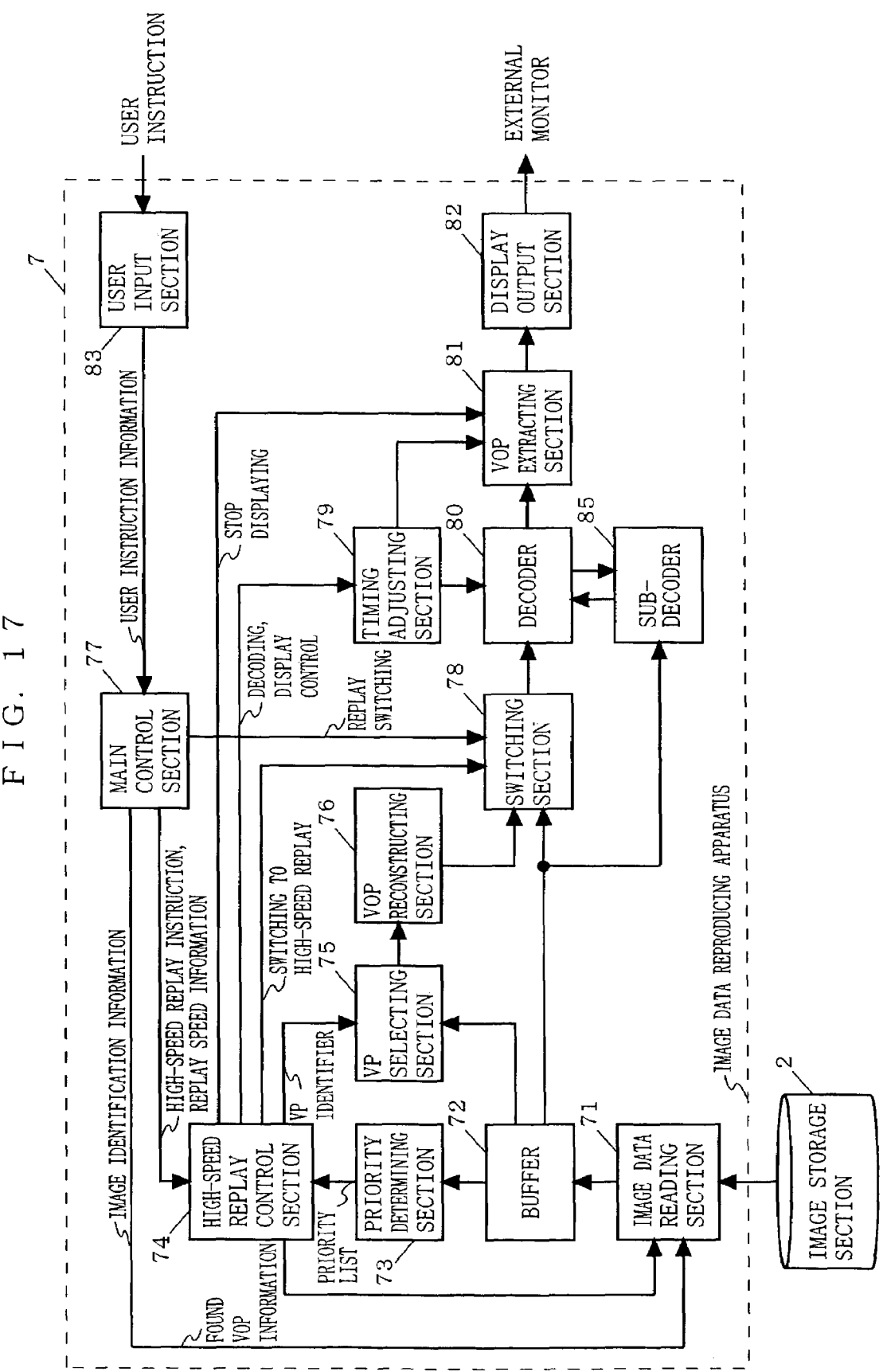
FIG. 17 is a block diagram illustrating another detailed configuration of the image data reproducing apparatus 7 of FIG. 11.
Figure 18:
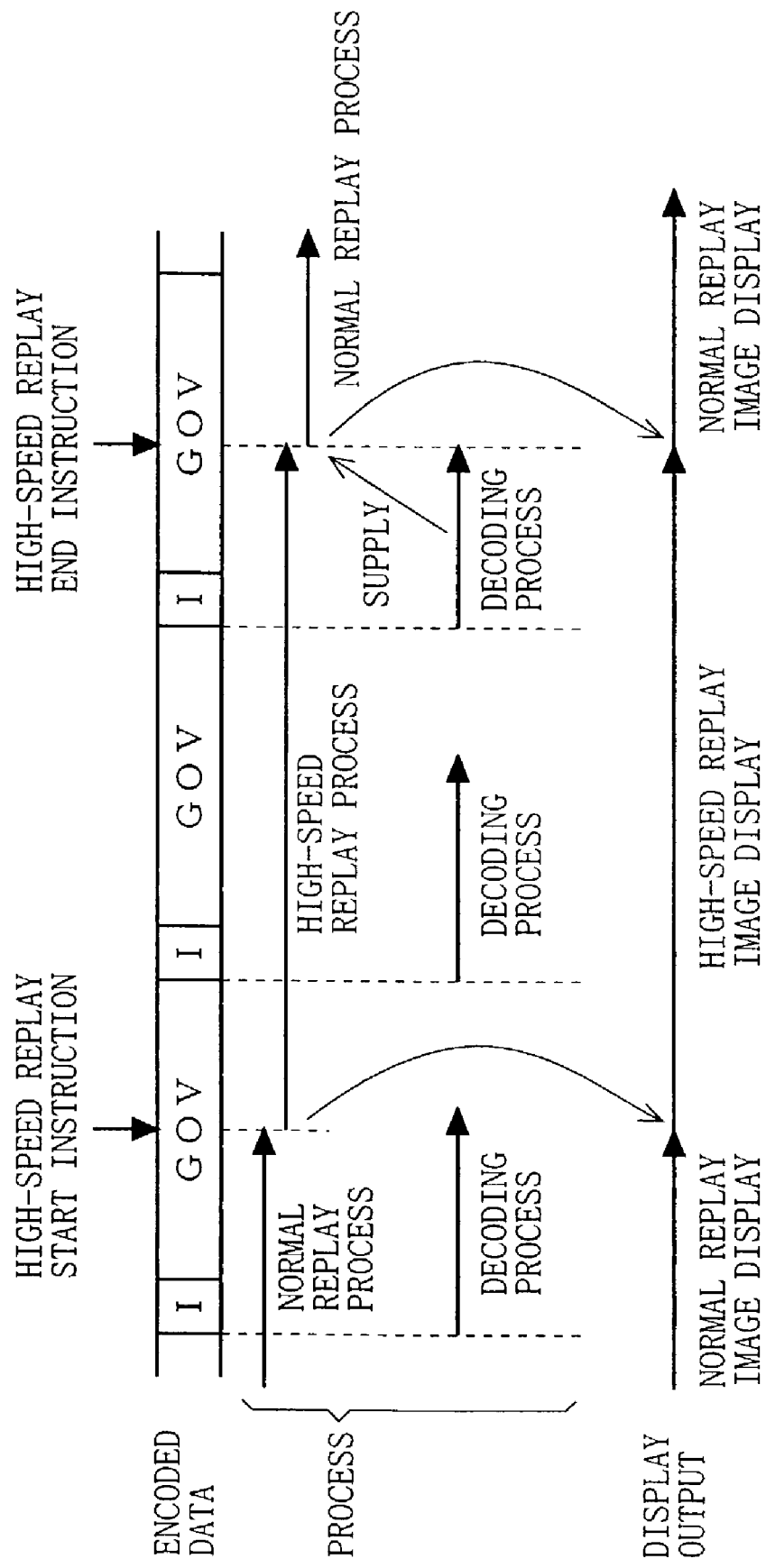
FIG. 18 is an illustration showing the operation carried out by the image data reproducing apparatus 7 of FIG. 17 when making a transition from high-speed replay to normal replay.
Figure 19:
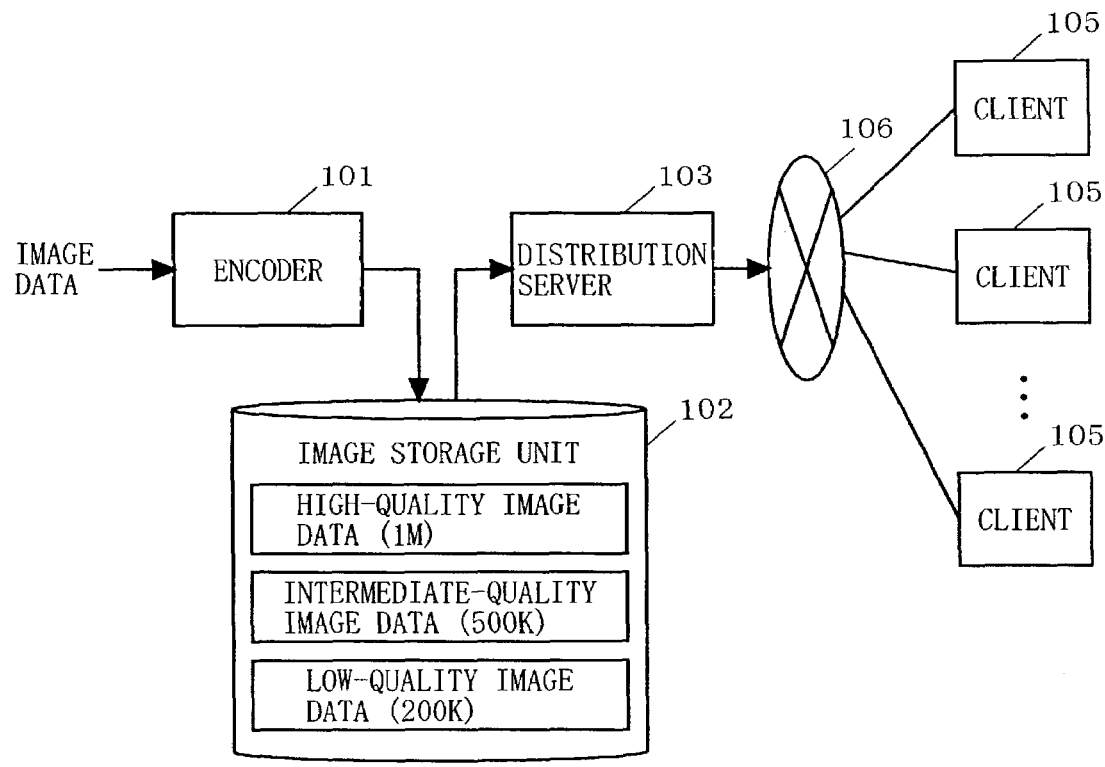
FIG. 19 is an illustration for describing an outline of a conventional first hierarchical encoding technique.
Figure 20:
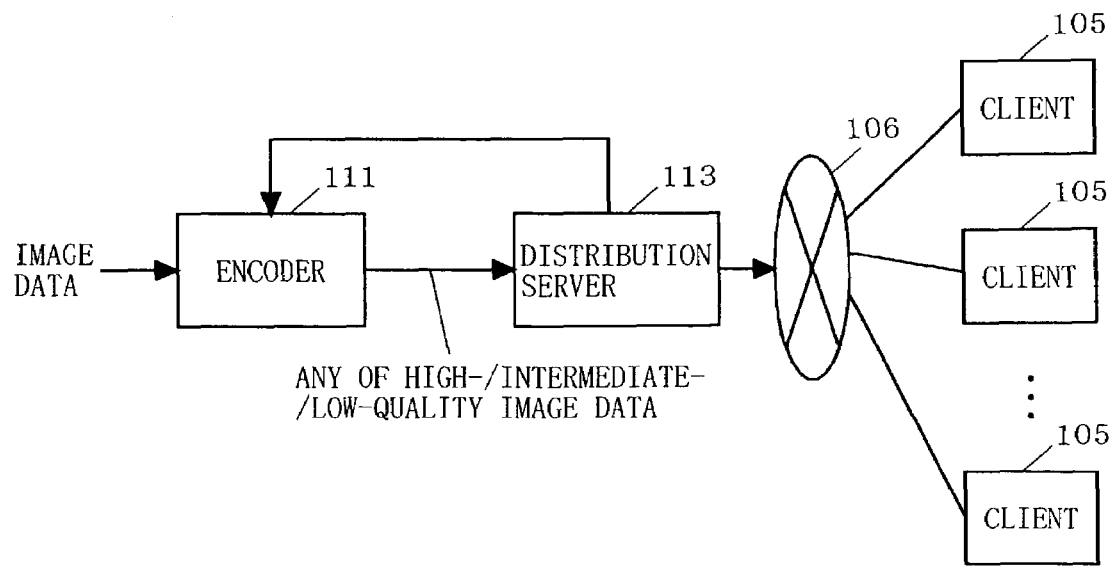
FIG. 20 is an illustration for describing an outline of a conventional second hierarchical encoding technique.

Furthermore, a plurality of decoders can be provided. FIG. 17 is a block diagram illustrating the structure of the image data reproducing apparatus 7 provided with these decoders. The image data reproducing apparatus 7 illustrated in FIG. 17 has the structure of the image data reproducing apparatus 7 illustrated in FIG. 12 further provided with a sub-decoder 85. This sub-decoder 85 always obtains encoded data from the buffer 72 for a normal decoding and decompressing process. During a high-speed replay process, the sub-decoder 85 performs a normal decoding and decompressing process. At the time of the high-speed replay end instruction, the sub-decoder 85 transfers the VOPs starting from an I-VOP that have been obtained so far through the decoding and decompressing process to the decoder 80. With this, the decoder 80 does not have to perform a re-decoding and re-decompressing process by going back to the I-VOP of the reference image. Therefore, normal image replay can be performed immediately after the time of the high-speed replay end instruction without degradation in image quality (FIG. 18).

As described in the foregoing, according to the image data reproducing apparatus and method of the second embodiment of the present invention, the priority of each VP is determined based on the average amount of encoded data obtained by dividing the amount of encoded data by the number of MBs. This determination is based on the fact that the amount of encoded data per MB is large in an area containing a large motion, which has a great impact on the image. At high-speed replay, VOPs for high-speed replay are generated by reconstructing VPs by prioritizing those of high priorities having a larger average amount of encoded data. Thus, MPEG-4 encoded data can be smoothly replayed at high speed. Also, these VOPs for high-speed replay are generated by putting an area having a large motion on a higher priority. Therefore, block noise can be suppressed.

In the above first and second embodiments, a case has been described in which the priority of each VP is determined based on the average amount of encoded data obtained by dividing the amount of encoded data by the number of MBs. Alternatively, if accuracy in priority is not much required, the priority of each VP can be determined based only on the number of MBs.

Furthermore, in the above first and second embodiments, each VOP is divided by the encoder 1 into VPs so that all VOPs are equal or approximately equal to each other in the total amount of encoded data of the VPs. Alternatively, even when each VOP is divided into VPs of an arbitrary amount of encoded data, the priority can be determined based on the average amount of encoded data obtained by dividing the amount of encoded data by the number of MBs. In this case, however, error resistance is decreased.

Still further, in the second embodiment, the priority of each VP contained in a single VOP is determined. Alternatively, the priority of each VP of all VOPs in a single GOV can be determined.

The image data transmitting method and the image data reproducing method described in the above first and second embodiments are typically achieved by a CPU interpreting predetermined program data that is stored in a storage device (ROM, RAM, hard disk, or the like) and is capable of performing the above-described procedure. In this case, the program data may be introduced via a recording medium, such as a CD-ROM or a flexible disk, to the storage device, or may be executed directly from the recording medium.

While the invention has been described in detail, the foregoing description is in all aspects illustrative and not restrictive. It is understood that numerous other modifications and variations can be devised without departing from the scope of the invention.

What is claimed is:

1. An image data transmitting apparatus which transmits image data having been encoded in units of macroblock, which is a basic picture element, and having been divided into a plurality of video packets each containing at least one macroblock, the apparatus comprising:

a priority determining section for extracting the number of macroblocks contained in each of the plurality of video packets, calculating, for each of the plurality of video packets, an average amount of data per macroblock by dividing an amount of data of each of the plurality of video packets by the respective extracted number of macroblocks contained in each of the plurality of video packets, and determining, for each of predetermined segments forming the image data and containing at least two video packets, a priority of each of the plurality of video packets in descending order of the average amount of data per macroblock; and a transmission control section for determining an amount of transmittable data of each of the predetermined segments based on a state of transmission of the image data, selecting, for each of the predetermined segments, video packets in descending order of priority until a total data amount of the selected video packets is equal to the amount of transmittable data, and transmitting the selected video packets.

2. The image data transmitting apparatus according to claim 1, wherein the image data has been encoded and divided into the video packets based on MPEG-4, and the predetermined segments of the image data are video object planes (VOPs).

3. The image data transmitting apparatus according to claim 1, wherein the image data has been encoded and divided into the video packets based on MPEG-4, and the predetermined segments of the image data are groups of video object planes (GOVs).

4. An image data transmitting apparatus which transmits image data having been encoded in units of macroblock, which is a basic picture element, and having been divided into a plurality of video packets approximately equal in data amount to each other and each containing at least one macroblock, the apparatus comprising:

a priority determining section for extracting the number of macroblocks included in each of the plurality of video packets, and determining, for each of predetermined segments forming the image data and containing at least two video packets, a priority of each of the plurality of video packets in ascending order of the number of macroblocks included in each of the video packets; and a transmission control section for determining an amount of transmittable data of each of the predetermined segments based on a state of transmission of the image data, selecting, for each of the predetermined segments, video packets in descending order of priority until a total data amount of the selected video packets is equal to the amount of transmittable data, and transmitting the selected video packets.

5. The image data transmitting apparatus according to claim 4, wherein the image data has been encoded and divided into the video packets based on MPEG-4, and the predetermined segments of the image data are video object planes (VOPs).

6. The image data transmitting apparatus according to claim 4, wherein the image data has been encoded and divided into the video packets based on MPEG-4, and the predetermined segments of the image data are groups of video object planes (GOVs).

7. An image data transmitting method for transmitting image data having been encoded in units of macroblock, which is a basic picture element, and having been divided into a plurality of video packets each containing at least one macroblock, the method comprising:

extracting the number of macroblocks contained in each of the plurality of video packets;

calculating, for each of the plurality of video packets, an average amount of data per macroblock by dividing an amount of data of each of the plurality of video packets by the respective extracted number of macroblocks contained in each of the plurality of video packets;

determining, for each of predetermined segments forming the image data and containing at least two video packets, a priority of each of the plurality of video packets in descending order of the average amount of data per macroblock;

determining an amount of transmittable data of each of the predetermined segments based on a state of transmission of the image data;

selecting, for each of the predetermined segments, video packets in descending order of priority until a total data amount of the selected video packets is equal to the amount of transmittable data; and transmitting the selected video packets.

8. The image data transmitting method according to claim 7, wherein the image data has been encoded and divided into the video packets based on MPEG-4, and the predetermined segments of the image data are video object planes (VOPs).

9. The image data transmitting method according to claim 7, wherein the image data has been encoded and divided into the video packets based on MPEG-4, and the predetermined segments of the image data are groups of video object planes (GOVs).

10. An image data transmitting method for transmitting image data having been encoded in units of macroblock, which is a basic picture element, and having been divided into a plurality of video packets approximately equal in data amount to each other and each containing at least one macroblock, the method comprising:

extracting the number of macroblocks included in each of the plurality of video packets;

calculating, for each of the plurality of video packets, an average amount of data per macroblock by dividing an amount of data of each of the plurality of video packets by the respective extracted number of macroblocks contained in each of the plurality of video packets;

determining, for each of predetermined segments forming the image data and containing at least two video packets, a priority of each of the plurality of video packets in descending order of the average amount of data per macroblock;

determining an amount of transmittable data of each of the predetermined segments based on a state of transmission of the image data;

selecting, for each of the predetermined segments, video packets in descending order of priority until a total data amount of the selected video packets is equal to the amount of transmittable data; and transmitting the selected video packets.

11. The image data transmitting method according to claim 10, wherein the image data has been encoded and divided into the video packets based on MPEG-4, and the predetermined segments of the image data are video object planes (VOPs).

12. The image data transmitting method according to claim 10, wherein the image data has been encoded and divided into the video packets based on MPEG-4, and the predetermined segments of the image data are groups of video object planes (GOVs).

13. A computer-readable recording medium for recording a program for causing a computer to execute a method for transmitting image data having been encoded in units of macroblock, which is a basic picture element, and having been divided into a plurality of video packets each containing at least one macroblock, the program comprising:

extracting the number of macroblocks included in each of the plurality of video packets;

calculating, for each of the plurality of video packets, an average amount of data per macroblock by dividing an amount of data of the plurality of video packets by said number of macroblocks for each of the plurality of video packets;

determining, for each of predetermined segments forming the image data and containing at least two video packets, a priority of each of the plurality of video packets in descending order of the average amount of data per macroblock;

determining an amount of transmittable data of each of the predetermined segments based on a state of transmission of the image data;

selecting, for each of the predetermined segments, video packets in descending order of priority until a total data amount of the selected video packets is equal to the amount of transmittable data; and transmitting the selected video packets.

14. A computer-readable recording medium for recording a program for causing a computer to execute a method for transmitting image data having been encoded in units of macroblock, which is a basic picture element, and having been divided into a plurality of video packets that are approximately equal in data amount to each other and each containing at least one macroblock, the program comprising:

extracting the number of macroblocks included in each of the plurality of video packets;

calculating an average amount of data per macroblock by dividing an amount of data of each of the plurality of video packets by the respective extracted number of macroblocks contained in each of the plurality of video packets;

determining, for each of predetermined segments forming the image data and containing at least two video packets, a priority of each of the plurality of video packets in descending order of the average amount of data per macroblock;

determining an amount of transmittable data of each of the predetermined segments based on a state of transmission of the image data;

selecting, for each of the predetermined segments, video packets in descending order of priority until a total data amount of the selected video packets is equal to the amount of transmittable data; and transmitting the selected video packets.

* * * * *